United States Patent
Kuwata et al.

(10) Patent No.: US 8,306,439 B2
(45) Date of Patent: Nov. 6, 2012

(54) COMMUNICATION APPARATUS AND SIGNAL RECEPTION METHOD

(75) Inventors: Naoki Kuwata, Kawasaki (JP); Tadashi Ikeuchi, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 712 days.

(21) Appl. No.: 12/457,593

(22) Filed: Jun. 16, 2009

(65) Prior Publication Data

US 2010/0003036 A1    Jan. 7, 2010

(30) Foreign Application Priority Data

Jul. 3, 2008  (JP) .................................. 2008-175022

(51) Int. Cl.
*H04B 10/06* (2006.01)

(52) U.S. Cl. ........................ 398/209; 398/202; 398/213

(58) Field of Classification Search .................. 398/208, 398/202, 203, 204, 207, 210, 211, 212, 214, 398/206, 209, 213; 375/324, 325, 326

See application file for complete search history.

(56) References Cited

U.S. PATENT DOCUMENTS

| 2006/0193640 A1 | 8/2006 | Katagiri et al. |
| 2009/0022497 A1* | 1/2009 | Mateosky et al. ............. 398/135 |
| 2009/0129788 A1* | 5/2009 | Seimetz ....................... 398/208 |

FOREIGN PATENT DOCUMENTS

| JP | 2006-270909 | 10/2006 |
| JP | 2007-20138 | 1/2007 |
| WO | 2007/007864 A1 | 1/2007 |
| WO | WO 2008/000401 | * 1/2008 |

* cited by examiner

*Primary Examiner* — M. R. Sedighian
(74) *Attorney, Agent, or Firm* — Staas & Halsey LLP

(57) ABSTRACT

A communication apparatus in accordance with an embodiment comprises a reception unit configured to demodulate a received signal to output a first demodulated signal in dependence on a reception condition. The communication apparatus further comprises a pattern detection unit configured to detect a characteristic pattern in the first demodulated signal to output a pattern detection signal, and a pitch detection unit configured to detect a pitch of the characteristic pattern based on the pattern detection signal to output a first signal detection signal indicating that the first demodulated signal is one of an in-phase signal and a quadrature signal, or an inverted version of the one of the in-phase signal and the quadrature signal.

17 Claims, 14 Drawing Sheets

FIG.8

(1) DATA SIGNAL BEING QUADRATURE SIGNAL Q
- (a) 110111011101[0110]01100110 — 812
- (b) 110111011101011001100110
- (c) [00000000]1011[00000000]
  - 810    811

(2) DATA SIGNAL BEING INVERTED VERSION OF QUADRATURE SIGNAL Q̄
- (a) 001000100010[1001]10011001 — 822
- (b) 001000100010100110011001
- (c) [00000000]1011[00000000]
  - 820    821

(3) DATA SIGNAL BEING IN-PHASE SIGNAL I
- (a) 111011101110[0000]00000000 — 832
- (b) 111011101110000000000000
- (c) [00000000]1110[00000000]
  - 830    831

(4) DATA SIGNAL BEING INVERTED VERSION OF IN-PHASE SIGNAL Ī
- (a) 000100010001[1111]11111111 — 842
- (b) 000100010001111111111111
- (c) [00000000]1110[00000000]
  - 840    841

COMMUNICATION APPARATUS AND SIGNAL RECEPTION METHOD

CROSS-REFERENCE TO RELATED APPLICATION

This application is based upon and claims the benefit of priority of the prior Japanese Patent Application No. 2008-175022, filed on Jul. 3, 2008, the entire contents of which are incorporated herein by reference.

FIELD

The present invention relates to a communication apparatus and a signal reception method. More specifically, the present invention relates to a communication apparatus adapted to monitor reception condition to control demodulated signals and a signal reception method.

BACKGROUND

Many optical communication systems use modulation methods such as differential quadrature phase shift keying (DQPSK) for improving frequency usage efficiency. The DQPSK modulation method uses optical phase difference between two consecutive symbols. It uses four optical phase difference values such as 0, π/2, π, and 3π/2 to transmit two bits per one symbol. In a DQPSK optical reception circuit, a received signal passes π/4 delay interferometer and −π/4 delay interferometer to yield two bits of electric data signal per one symbol by means of photo diodes. Two bits of electric data signal are successfully recovered subject that the optical phase differences of delay interferometers are accurately adjusted to π/4 and −π/4, respectively.

However, such a conventional DQPSK optical reception circuit may fail to correctly recover data signals since the circuit may output multiple different types of demodulation signals.

A technique is proposed in which frame detection is carried out for every frame patterns that may be potentially output from the interferometers to select a correct demodulation signal from the outputted frame patterns.

FIG. 1 depicts a conventional DQPSK optical signal reception circuit 100. The optical reception module 100 depicted in FIG. 1 receives a DQPSK optical signal to demodulate it into data signals A and B with a DQPSK reception unit (reference numerals 101 through 133). The optical reception module 100 further de-multiplexes the data signals A and B into a data signal P with a demultiplexer 150. It is preferred that the data signals A and B outputted from the interferometers are a quadrature signal Q and an in-phase signal I, respectively. However, a set of the data signals A and B may not be a set of signal Q and signal I, respectively depending on the reception condition (demodulation condition) of the interferometers. The set of data signals A and B is uncertain and may be any one of multiple different combinations indicated in a table "DQPSK signal reception condition" in FIG. 1. In the table "DQPSK signal reception condition," a double circle indicates a preferred reception condition, a single circle indicates a possible but not preferred reception condition, and a cross indicates an impossible reception condition.

A correct data signal (the preferred reception condition) may be acquired by processing the set of data signals A and B (the data signal P) outputted from the DQPSK optical reception module 100 with a frame processing circuit 170. The frame processing circuit 170 has a frame processing unit 171 to process frames, a frame synchronization circuit 172 to detect frames for all possible frame patterns to detect the reception condition, and a reception condition identification unit 173 to identify the reception condition.

The conventional arrangement depicted in FIG. 1 requires the combination of the optical reception module 100 and the frame processing circuit 170 for correct data signal demodulation. In addition, the frame synchronization circuit 172 becomes relatively large.

[Patent Document 1] Japanese Laid-open Patent Publication No. 2007-20138

[Patent Document 2] Japanese Laid-open Patent Publication No. 2006-270909

SUMMARY

According to an aspect of the invention, a communication apparatus comprises:

a reception unit configured to demodulate a received signal to output a first demodulated signal in dependence on a reception condition;

a pattern detection unit configured to detect a characteristic pattern in the first demodulated signal to output a pattern detection signal; and a pitch detection unit configured to detect a pitch of the characteristic pattern based on the pattern detection signal to output a first signal detection signal indicating that the first demodulated signal is a first signal, the first signal being an in-phase signal or a quadrature signal.

According to another aspect of the invention, a method of receiving a signal comprises:

demodulating a received signal to output a first demodulated signal in dependence on a reception condition;

detecting a characteristic pattern in the first demodulated signal to output a pattern detection signal; and detecting a pitch of the characteristic pattern based on the pattern detection signal to output a first signal detection signal indicating that the first demodulated signal is a first signal, the first signal being an in-phase signal or a quadrature signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 depicts various signal pattern of an OTU 3 signal which may be used in another embodiment;

DESCRIPTION OF EMBODIMENTS

Figure 1:
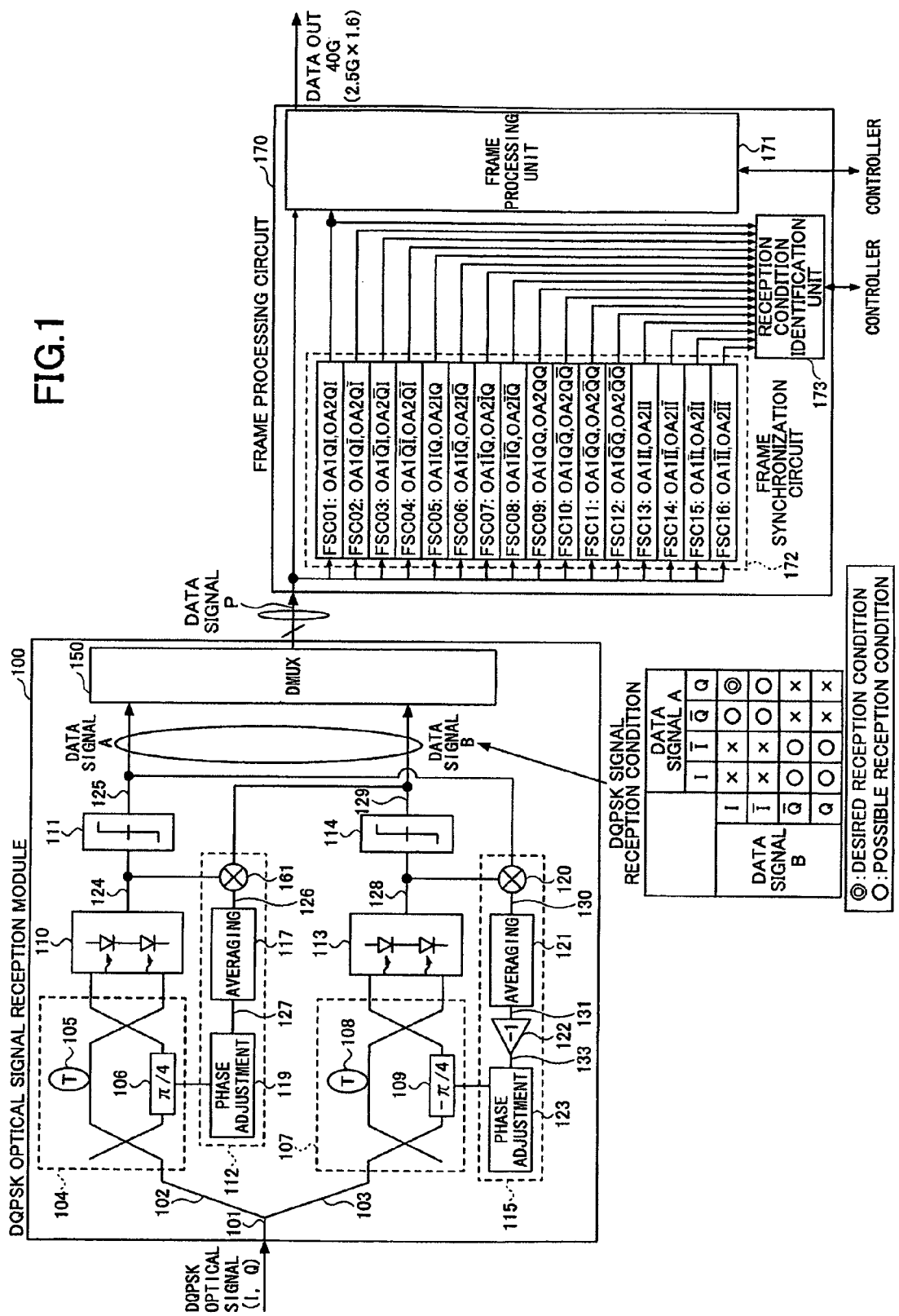
FIG. 1 depicts a conventional DQPSK optical signal reception circuit.

Embodiments of the present invention are described in detail with reference to the accompanied drawings. Similar or corresponding components are designated by the same reference numerals throughout the drawings.

Various embodiments utilizing DQPSK or DPSK modulation scheme are discussed below. However, it would be appreciated by one with ordinary skills in the art that the present invention is not limited to the embodiments and may be applicable to other types of PSK modulation schemes. Furthermore, the present invention is not limited to the PSK modulation schemes, and is further applicable to other modulation schemes.

Figure 2:
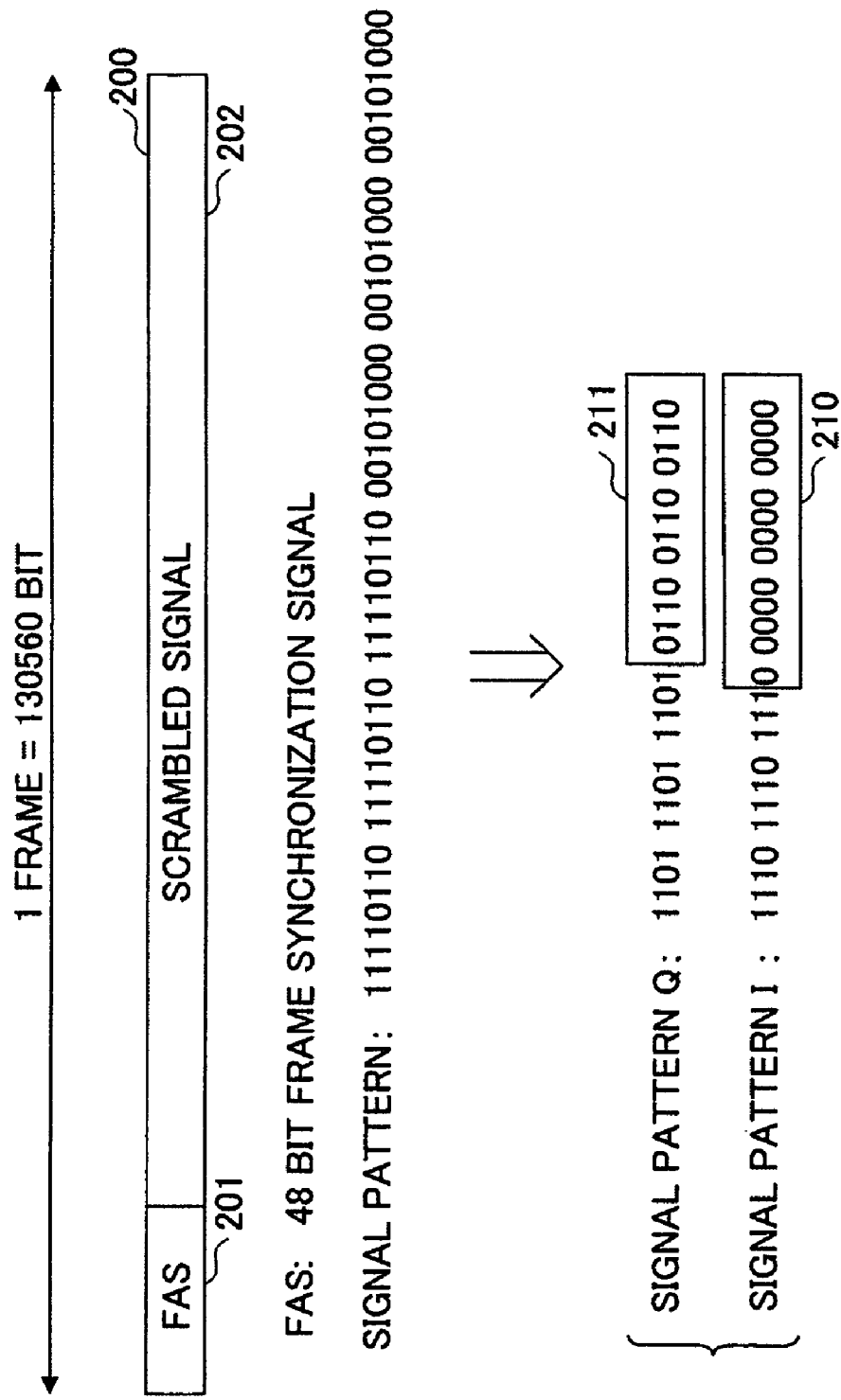
FIG. 2 depicts various signal pattern of an OTU 3 signal which may be used in an embodiment.

FIG. 2 illustrates a characteristic pattern of an Optical channel Transport Unit 3 (OTU3) signal which may be used in an embodiment. The OTU3 signal (43.02 Gb/s) is a signal defined by Optical Transport Network (OTN) standard recommended by ITU-T in the year 2000. The OTU3 frame 200 illustrated in FIG. 2 includes a Frame Alignment Signal (FAS) region 201 and a frame region 202 which carries payload and other scrambled signals. The FAS region 201 is a 48-bit long frame synchronization signal having a signal pattern illustrated in FIG. 2.

The DQPSK modulation scheme combines two (2) bits into one (1) symbol to be transmitted using a quadrature signal Q and an in-phase signal I. FIG. 2 further illustrates the signal patterns of the quadrature signal Q (also referred to as Q signal) and the in-phase signal I (also referred to as I signal). It is noted that the signal pattern of I signal includes a characteristic pattern, the occurrence of thirteen (13) consecutive 0's ("0 0000 0000 0000") as designated by reference numeral 211. It is also noted that the signal pattern of Q signal includes a characteristic pattern which is the occurrence of three consecutive "0110" ("0110 0110 0110") as designated by reference numeral 211.

According to an embodiment, the characteristic pattern of I signal, the occurrence of thirteen consecutive 0's, is detected to determine whether the output of an interferometer is the in-phase signal I. In addition, the characteristic pattern of Q signal, the occurrence of three consecutive "0110," is detected to determine whether the signal Q is logically inverted. According to another embodiment, any characteristic pattern included in the FAS region 201 may be utilized.

In the present embodiment, the signal pattern of the FAS signal is divided into two signal patterns, in which the pattern "1101 1101 1101 0110 0110 0110" is referred to as the signal pattern of a quadrature signal Q and the pattern "1110 1110 1110 0000 0000 0000" is referred to as the signal pattern of an in-phase signal I. For DQPSK modulation scheme, the reference of I signal and that of Q signal are optional since it is not well-defined. According to another embodiment, one may refer to the pattern "1101 1101 1101 0110 0110 0110" as the signal pattern of the in-phase signal I and the pattern "1110 1110 1110 0000 0000 0000" as the signal pattern of the quadrature signal Q. Similarly, in the description of specific embodiments, one of two signals is referred to as the quadrature signal Q and the other as the in-phase signal I. Such reference is merely for convenience of description. In another embodiment, one may refer to the former as the in-phase signal I and the latter as the quadrature signal Q.

Figure 3:
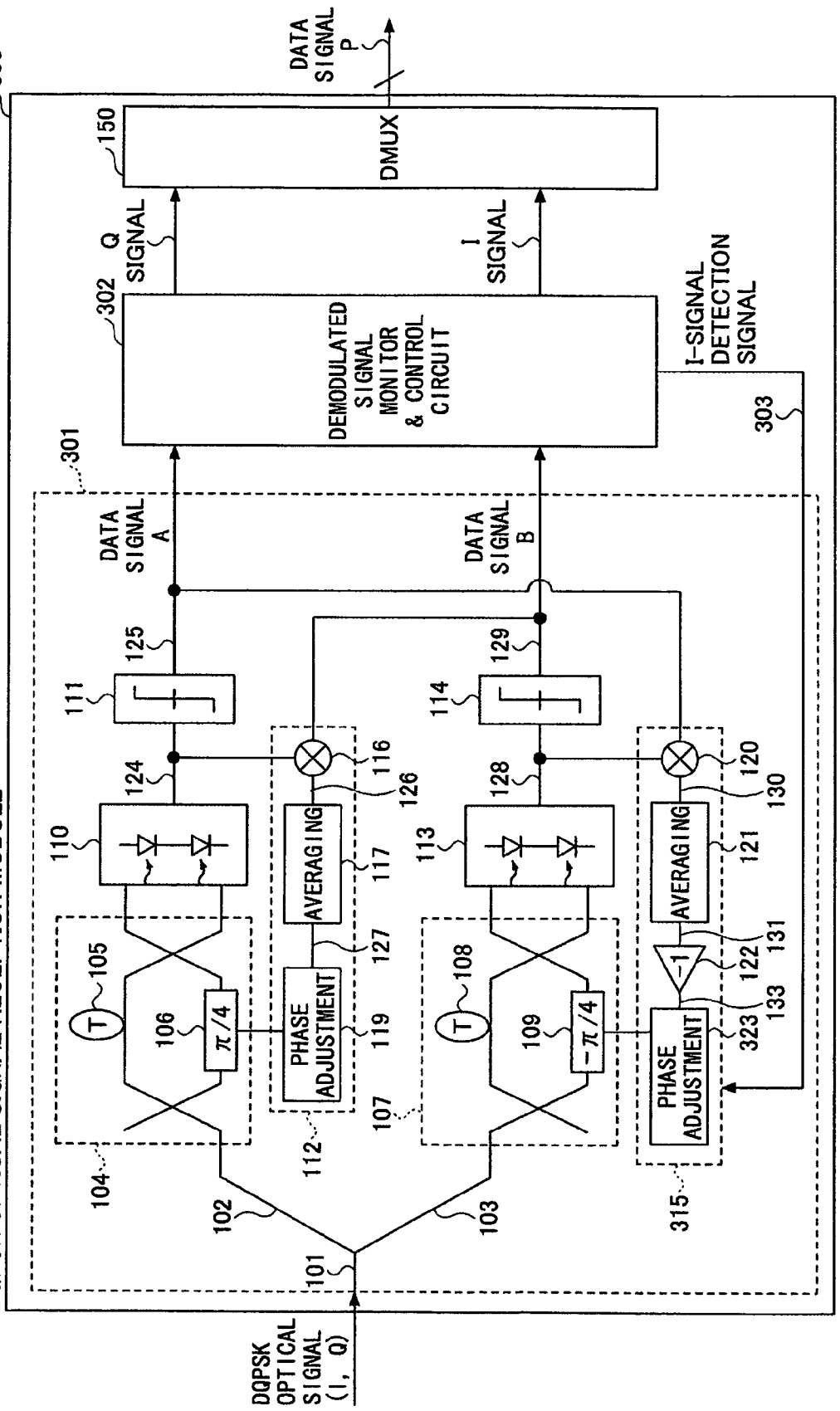
FIG. 3 depicts an exemplary DQPSK optical signal reception module according to an embodiment.

FIG. 3 depicts an exemplary DQPSK optical signal reception module according to an embodiment. The DQPSK optical signal reception module 300 illustrated in FIG. 3 includes a DQPSK reception unit 301 that receives a DQPSK signal including both I signal and Q signal and outputs data signals A and B.

As illustrated in FIG. 3, the DQPSK reception unit 301 is provided with two branches (referred to as A branch 102 and B branch 103). The A branch 102 includes a Mach-Zender interferometer 104, a balanced optical detector 110, a data recovery circuit 111, and a phase control unit 112. Similarly, the B branch 103 includes a Mach-Zender interferometer 107, a balanced optical detector 113, a data recovery circuit 114, and a phase control unit 315. The interferometers 104 and 107 include respective optical delay element 105 and 108 at their upper arms. Delay time corresponds to one symbol time of the optical DQPSK system. For the optical DQPSK system, one symbol time corresponds to the inverse of data bit rate multiplied by two. The interferometers 104 and 107 include respective phase shift element 106 and 109 at their lower arms. The phase shift of the phase shift element 106 provided in the A branch is "π/4." The phase shift of the phase shift element 109 provided in the B branch is "−π/4." Those phase shifts are to be controlled by the phase control units 112 and 315.

In the A branch, one of two input terminals provided to the phase control unit 112 is connected to an input terminal of the data recovery circuit 111, and the other input terminal of the two input terminals provided to the phase control unit 112 is connected to an output terminal of the data recovery circuit 114. The output terminal of the phase control unit 112 is connected to the phase shift element 106 of the interferometer 104. Similarly, in the B branch, one of two input terminals provided to the phase control unit 315 is connected to an input terminal of the data recovery circuit 114, and the other input terminal of the two input terminals provided to the phase control unit 315 is connected to an output terminal of the data recovery circuit 111. The output terminal of the phase control unit 315 is connected to the phase shift element 106 of the interferometer 107. In other words, the input signals provided to the phase control unit 112 in the A branch are signal 124 outputted from the balanced photo detector 110 and signal 129 outputted from the data recovery circuit 114. In addition, the input signals provided to the phase control unit 315 in the B branch are signal 128 outputted from the balanced photo detector 113 and signal 125 outputted from the data recovery circuit 111.

Any suitable interferometer, balanced photo detector, and data recovery circuit known in the art can be used for the reception unit.

As shown in FIG. 3, in the A branch, the phase control unit 112 includes a phase monitor unit (comprised of a mixer 116 and average unit 117 in this case) and a phase adjustment unit 119 connected at the subsequent stage of the phase monitor unit. In the B branch, the phase control unit 315 included as phase monitor unit (comprised of a mixer 120 and an average unit 121 in this case), an inverter circuit 122, and a phase adjustment unit 323 connected in series. The inverter circuit 122 is a known inverter circuit in the present example. The mixers 116 and 120 are used for multiplication of two input signals. The average units 117 and 121 average respective signals from the mixers. The mixers and the average units are well known in the art. The mixer may be an analog mixer (a mixer supplied by Spectrum Microwave Corporation, for example). Alternatively, the mixer may be realized by multiplication operation performed by a digital signal processor (DSP) provided at a subsequent stage of an analog-to-digital converter (ADC). In other words, the mixer may be any suitable combination of an ADC and a subsequent DSP. The ADC may be an analog-to-digital converter supplied by Analog Device Corporation, for example. The average unit may be realized by a low-pass filter which filters out the high frequency component of an input signal and passes the low frequency component of the input signal. Alternatively, the average unit may be realized by an averaging operation performed by a digital signal processor (DSP).

A DQPSK-modulated signal 101 (denoted as s(t)) may be represented as:

$$s(t)=A(t)\exp(\phi_n)\exp(j\omega t)$$

where A(t) indicates a pulse waveform corresponding to one symbol. "$\phi_n$" indicates the phase of n-th symbol. "$\omega$" indicates the angular frequency of an optical carrier wave. "$\phi_n$" may take one of four values: $\pi/4$, $3\pi/4$, $5\pi/4$ and $7\pi/4$.

For DQPSK, information is carried as a phase difference between consecutive symbols. The phase difference between consecutive symbols may be one of four values: $\pi/4$, $3\pi/4$, $5\pi/4$ and $7\pi/4$.

According to the theory of DQPSK modulation scheme, in the A branch, signal 124 outputted by the balanced photo detector 110 may be represented as:

$$A^2(t)\cos(\Delta\phi+\pi/4+\delta_A)$$

In addition, in the B branch, signal 128 outputted by the balanced photo detector 113 may be represented as:

$$A^2(t)\cos(\Delta\phi-\pi/4+\delta_B)$$

where "$\Delta\phi$" indicates a phase difference between two consecutive symbols. "$\delta A$" indicates a phase error of the phase shift element 106 in the A branch, and "$\delta B$" indicates a phase error of the phase shift element 109 in the B branch.

The data recovery circuit 111 recovers A branch data (data signal A) 125 by comparing signal 124 with a predetermined threshold value. A recovered data 125 may be:

$$\cos(\Delta\phi+\pi/4)=-\sin(\Delta\phi-\pi/4)$$

Similarly, a recovered data 129 (data signal B) in the B branch may be:

$$\cos(\Delta\phi-\pi/4)=\sin(\Delta\phi+\pi/4).$$

Those equations are known in the art.

In the A branch, the mixer 116 receives signals 124 and 129 as input signals. An output 126 of the mixer 116 may be represented as:

$$A^2(t)\cos\left(\frac{\Delta\varphi+\Pi}{4+\delta_A}\right)\cos\left(\frac{\Delta\varphi-\Pi}{4}\right) = A^2(t)\cos\left(\frac{\Delta\varphi+\Pi}{4+\delta_A}\right)\sin\left(\frac{\Delta\varphi+\Pi}{4}\right)$$

$$= A^2(t)\cos\left(\frac{\Delta\varphi+\Pi}{4}\right)\sin\left(\frac{\Delta\varphi+\Pi}{4}\right)$$

$$\cos(\delta_A) - A^2(t)\sin^2\left(\frac{\Delta\varphi+\Pi}{4}\right)\sin(\delta_A)$$

The phase difference $\Delta\phi$ distributes evenly, and as a result, the first term in the above equation may be canceled by the average unit 117. The second term of the above equation may be $-A^2(t)\sin(\delta_A)/2$ at a preceding stage of the average unit 117 regardless of the phase difference $\Delta\phi$. Thus, once averaged by the average unit 117, "$A^2(t)$" yields a fixed value which is not dependent on the information carried. Accordingly, signal 127 outputted from the average unit 117 becomes proportional to "$-\sin(\delta_A)$." For a small phase error, the signal 127 may be approximated as "$-\delta_A$."

As described above, the phase monitor can determine the signature of the phase error as well as the amount of the phase error. In addition, the differential coefficient of the phase error signal 127 with respect to the phase error is constant, and consequently, the sensitivity of the phase monitor is also constant.

In the B branch, the mixer 120 receives signals 125 and 128 as input signals. An output 130 of the mixer 120 may be represented as:

$$A^2(t)\cos\left(\frac{\Delta\varphi-\Pi}{4+\delta_B}\right)\cos\left(\frac{\Delta\varphi+\Pi}{4}\right) = -A^2(t)\cos\left(\frac{\Delta\varphi-\Pi}{4+\delta_B}\right)\sin\left(\frac{\Delta\varphi-\Pi}{4}\right)$$

$$= -A^2(t)\cos\left(\frac{\Delta\varphi-\Pi}{4}\right)\sin\left(\frac{\Delta\varphi-\Pi}{4}\right)$$

$$\cos(\delta_B) + A^2(t)\sin^2\left(\frac{\Delta\varphi-\Pi}{4}\right)\sin(\delta_B)$$

The phase difference $\Delta\phi$ distributes evenly, and as a result, the first term in the above equation may be canceled by the average unit 121. The second term of the above equation may be $A^2(t)\sin(\delta_B)/2$ at a preceding stage of the average unit 121 regardless of the phase difference $\Delta\phi$. Thus, once averaged by the average unit 121, "$A^2(t)$" yields a fixed value which is not dependent on the information carried. Accordingly, signal 131 outputted from the average unit 121 becomes proportional to "$\sin(\delta_B)$." For a small phase error, the signal 131 may be approximated as "$\delta_B$."

As described above, the phase monitor can determine the signature of the phase error as well as the amount of the phase error. In addition, the differential coefficient of the phase error signal 131 with respect to the phase error is constant, and consequently, the sensitivity of the phase monitor is also constant.

The phase error signal 131 is provided to the inversion circuit 122 which is an inverter circuit at the subsequent stage of the phase monitor. The inversion circuit 122 inverts the phase error signal 131 into a phase adjustment signal 133, which is inputted to the phase adjustment unit 323. The phase error signal 127 is inputted to the phase adjustment unit 119 as a phase adjustment signal.

When the phase adjustment signal 127 (and/or 133) is positive, the phase adjustment unit 119 (and/or 323) increases phase shifted by a corresponding interferometer, and when the phase adjustment signal is negative, the phase adjustment unit decreases the phase shifted by the corresponding interferometer. When the phase adjustment signal is zero, the phase adjustment units 119/323 do not change the phase shift, that is, maintains the phase shift of the phase shift elements 106/109. The phase adjustment unit 119/323 may be any suitable phase adjuster known in the art. For example, DPSK demodulator supplied by ITF Optical Technologies Corporation is a Mach-Zender type interferometer with a phase adjustment unit which adjusts the phase shift of the interferometer by means of temperature adjustment of the interferometer.

An assumption is made that the phase shift by the phase shift element 106 in the A branch is $\pi/4+\delta_A$. That is, the phase of the phase shift element 106 is assumed to include a positive phase error $\delta_A$. In this case, the phase monitor unit outputs a signal 127, $-\delta_A$ (<0). Then, the phase adjustment signal 127 becomes negative, and as a result, the phase adjustment unit 119 reduces the phase shift by the phase shift element 106. Consequently, the phase approaches a target value of $\pi/4$. If the phase of the phase shift element 106 includes a negative phase error, the phase monitor unit outputs a positive signal 127, which causes the phase adjustment unit 119 to increase the phase shift of the phase shift element 106. Consequently, the phase approaches a target value of $\pi/4$. If the phase error is zero, the phase monitor unit outputs zero signal. In this case, the phase adjustment unit maintains the phase of the phase shift element 106.

Similarly, an assumption is made that the phase of the phase shift element 109 in the B branch is $-\pi/4+\delta_B$. That is, the phase of the phase shift element 109 is assumed to include a positive phase error $\delta_B$. In this case, the phase monitor unit outputs a signal 131, $\delta_B$ (>0). The inverse circuit 122 outputs a phase adjustment signal 133, $-\delta_B$ (<0). Then, the phase adjustment signal 133 is negative, and as a result, the phase adjustment unit 323 reduces the phase shift by the phase shift element 109. Consequently, the phase approaches a target value of $-\pi/4$. If the phase of the phase shift element 109 includes a negative phase error, the phase monitor unit outputs a negative signal 131, and the inverse circuit 122 outputs a positive phase adjustment signal 133, which causes the phase adjustment unit 122 to increase the phase shift of the phase shift element 109. Consequently, the phase approaches a target value of $-\pi/4$. If the phase error is zero, the phase monitor unit outputs zero signal. In this case, the phase adjustment unit maintains the phase of the phase shift element 109.

However, the signal waveform of DQPSK optical signal may be degraded during the transmission through an optical channel due to the wavelength dispersion and/or non-linear effect of optical fibers. In addition, the interferometers 106 and 109 may have different optimal operational points due to aging and temperature difference, and may fail to output the desired signals, I and Q signals. Consequently, the data signals A and B outputted by the DQPSK receiving unit 301 may be uncertain in dependence on the reception condition (modulation condition) of the DQPSK receiving unit 301 as discussed with respect to FIG. 1. To avoid this uncertainty, the DQPSK optical reception module 300 further includes a demodulated signal monitor & control circuit (DSMCC) 302. The DSMCC 302 receives the data signals A and B outputted by the DQPSK reception unit 301. The DSMCC 302 detects a characteristic pattern in the data signal B and determines whether the characteristic pattern is repeated by the frame cycle of the DQPSK optical signal. In dependence on the determination, the DSMCC 302 outputs an I-signal detection signal which indicates that the data signal B is an I signal.

Figure 4:
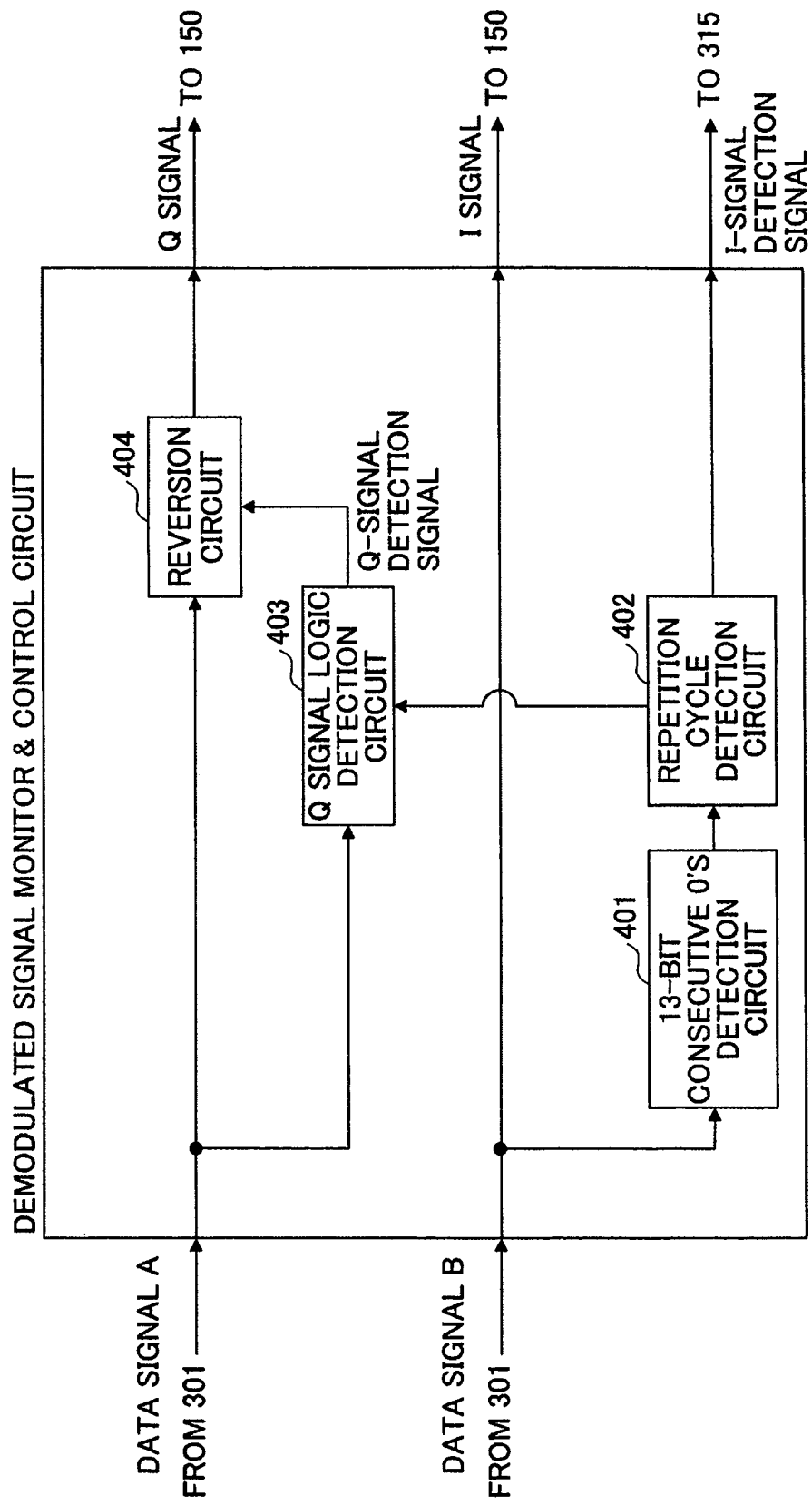
FIG. 4 depicts an exemplary demodulated signal monitor & control circuit according to an embodiment.

Further referring to FIG. 4, the operation of the demodulated signal monitor & control circuit (DSMCC) 302 is described in detail. FIG. 4 depicts an exemplary DSMCC 302 according to an embodiment. The DSMCC 302 depicted in FIG. 4 includes a 13 bits consecutive zeros detection circuit (thirteen 0's detection circuit) 401, a repetition cycle detection circuit 402, a Q signal logic detection circuit 403, and an inversion circuit 404.

The thirteen 0's detection circuit 401 receives the data signal B from the DQPSK reception unit 301, and attempts to detect the characteristic pattern 210 in which the consecutive occurrence of 0's for 13 bits in the signal pattern of I signal as described with reference to FIG. 2. When the thirteen 0's detection circuit 401 detects the characteristic pattern 210 (see FIG. 2), the thirteen 0's detection circuit 401 outputs a pattern detection signal indicating the detection of the characteristic pattern to the repetition cycle detection circuit 402. The pattern detection signal may be a pulse signal in synchronization with the characteristic pattern occurrence.

The repetition cycle detection circuit 402 receives the pattern detection signal and determines whether the cycle of the pattern detection signal corresponds to the frame cycle of the DQPSK optical signal. The correspondence of the cycle of the pattern detection signal to that of the DQPSK optical signal means the in-phase signal I is output as the data signal B. The determination by the repetition cycle detection circuit 402 eliminates or at least reduces the possibility that an occasional occurrence of thirteen consecutive 0's is mistaken for the characteristic pattern. The repetition cycle detection circuit 402 outputs the I-signal detection signal that indicates the correspondence of the cycle of pattern detection signal to that of DQPSK optical signal, which means the detection of the in-phase signal I. The I-signal detection signal outputted by the repetition cycle detection circuit 402 is sent to the phase control unit 315 in the B branch 103. In addition, the repetition cycle detection circuit 402 outputs a signal indicating the detection of the in-phase signal I to the Q signal logic detection circuit 403. The signal may be the same as the I-signal detection signal, for example.

The detection of the in-phase signal I as the data signal B means that the DQPSK reception unit 301 outputs the quadrature signal Q or its inverted version is outputted as the data signal A. Thus, when the Q signal logic detection circuit 403 receives as one of inputs the signal indicating the detection of the in-phase signal I from the repetition cycle detection circuit 402, the Q signal logic detection circuit 403 examines the data signal A inputted as the other input, and determines whether the quadrature signal Q is outputted from the DQPSK reception unit 301 and it is not logically inverted. The determination can be made by detecting the signal pattern 211 of the quadrature signal Q in the data signal A as described with reference to FIG. 2. The occurrence of the signal pattern 211 (FIG. 2) of the quadrature signal Q in the data signal A means that the data signal A is the quadrature signal Q. If the data signal A is the quadrature signal Q, the Q signal logic detection circuit 403 sends a Q-signal detection signal indicating the data signal A being the quadrature signal Q to the reversion circuit 404. The Q-signal detection signal causes the reversion circuit 404 to path the data signal A without inverting it.

The absence of the signal pattern 211 (FIG. 2) of the quadrature signal Q in the data signal A means that the data signal A is the inverted version of the quadrature signal Q. The Q signal logic detection circuit 403 does not output the Q-signal detection signal to the reversion circuit 404. In the absence of the Q-signal detection signal from the Q signal logic detection circuit 403, the inversion circuit 404 outputs the inverted version of the data signal A, or the quadrature signal Q.

Returning to FIG. 3, the DQPSK optical reception module 300 further includes a de-multiplexer (DMUX) 150. The DMUX 150 receives the data signal A (that is, the quadrature signal Q) and the data signal B (that is, the in-phase signal I) from the DSMCC 302 and demultiplex them into 16 bits parallel signal (data signal P) for output.

As described above, when the loop for controlling interferometer of the DQPSK reception unit 301 becomes stable, and the I-signal detection signal 303 is outputted from the DSMCC 302, the DSMCC 302 outputs the quadrature signal Q and the in-phase signal I, and consequently, the demultiplexer 350 outputs the right data signal P.

In the embodiment described above, the characteristic pattern 210 of the occurrence of thirteen-bit consecutive 0's in the in-phase signal I described with reference to FIG. 2 is used as the characteristic pattern of the in-phase signal I. In another embodiment, any suitable characteristic pattern may be used. An example of such a characteristic pattern will be described with reference to FIGS. 8 and 10.

In the embodiment described above, the characteristic pattern of the in-phase signal I is detected. In another embodiment, any suitable characteristic pattern of the quadrature signal Q may be detected. In a further embodiment, any suitable characteristic pattern in the inverted version of the in-phase signal I may be detected. In such a case, an inversion circuit (not shown) may be provided for logically inverting the data signal B to output the in-phase signal I in the DSMCC 302 in FIG. 4. In a further embodiment, any suitable characteristic pattern in the inverted version of the quadrature signal Q may be detected. In such a case, an inversion circuit (not shown) may be provided for logically inverting the data signal B to output the quadrature signal Q in the DSMCC 302 in FIG. 4.

In the case in which the data signal B outputted from the DQPSK reception unit 301 is not the in-phase signal I, the DQPSK reception unit 301 shift the phase of the phase shift element 109 of the interferometer 107 by π/2. This step will be repeated until the interferometer becomes stable and the DSMCC 302 starts outputting the I-signal detection signal 303. According to the above arrangement, the DQPSK optical reception module 300 can output the right data signal P regardless of the reception condition (demodulation condition) of the DQPSK reception unit 301. Thus, the DQPSK optical reception module 300 with DSMCC 302 can output the right data signal P. These steps will be described in more detail with reference to FIGS. 6 and 7.

Figure 5:
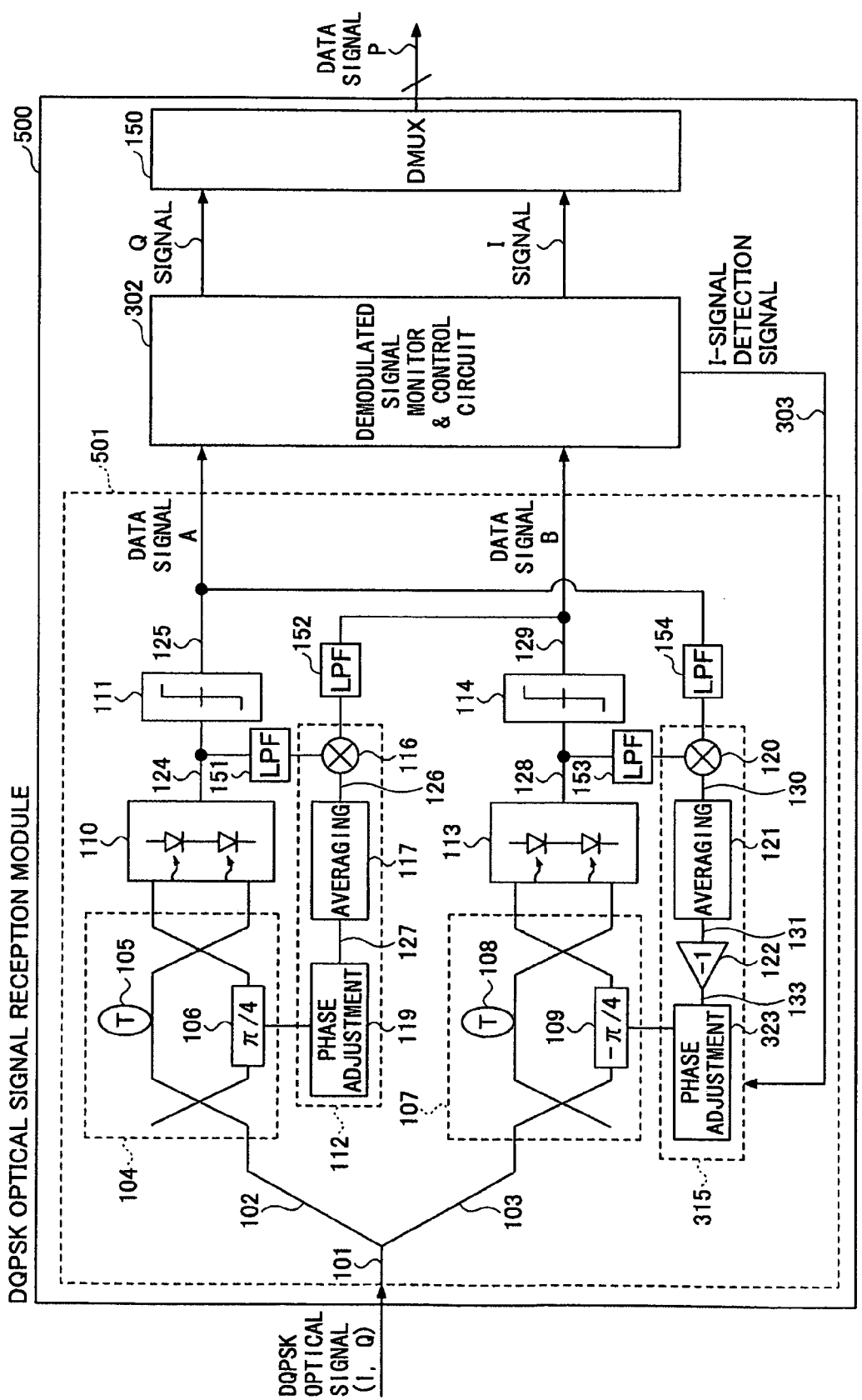
FIG. 5 depicts a variation of DQPSK optical signal reception module of FIG. 3.

FIG. 5 depicts a variation of DQPSK optical signal reception module of FIG. 3. The DQPSK optical reception module 500 depicted in FIG. 5 is similar in configuration to the DQPSK optical reception module 300 depicted in FIG. 3. It is noted that the DQPSK optical reception module 500 has low-pass filters 151 and 152 for filtering the signals 124 and 129 inputted to a mixer 116 in A branch 102. The DQPSK optical reception module 500 further has low-pass filters 153 and 154 for filtering the signal 128 and 125, respectively, inputted to a mixer 120 in B branch 103. The provision of low-pass filters may lower the frequency range to be supported by the mixers 116 and 120, which results in the lower cost of the mixers 116 and 120. It would be appreciated by one with ordinary skill in the art that the low-pass filters may be provided at any suitable location and is not limited to the described locations. Since the other portion of the DQPSK optical reception module 500 is the same as that of the DQPSK optical reception module 300, its description is omitted.

In the variation described in FIG. 5, when the loop for controlling interferometer of the DQPSK reception unit 501 becomes stable, and the I-signal detection signal 303 is outputted from the DSMCC 302, the DSMCC 302 outputs the quadrature signal Q and the in-phase signal I, and consequently, the demultiplexer 150 outputs the right data signal P.

Figure 6:
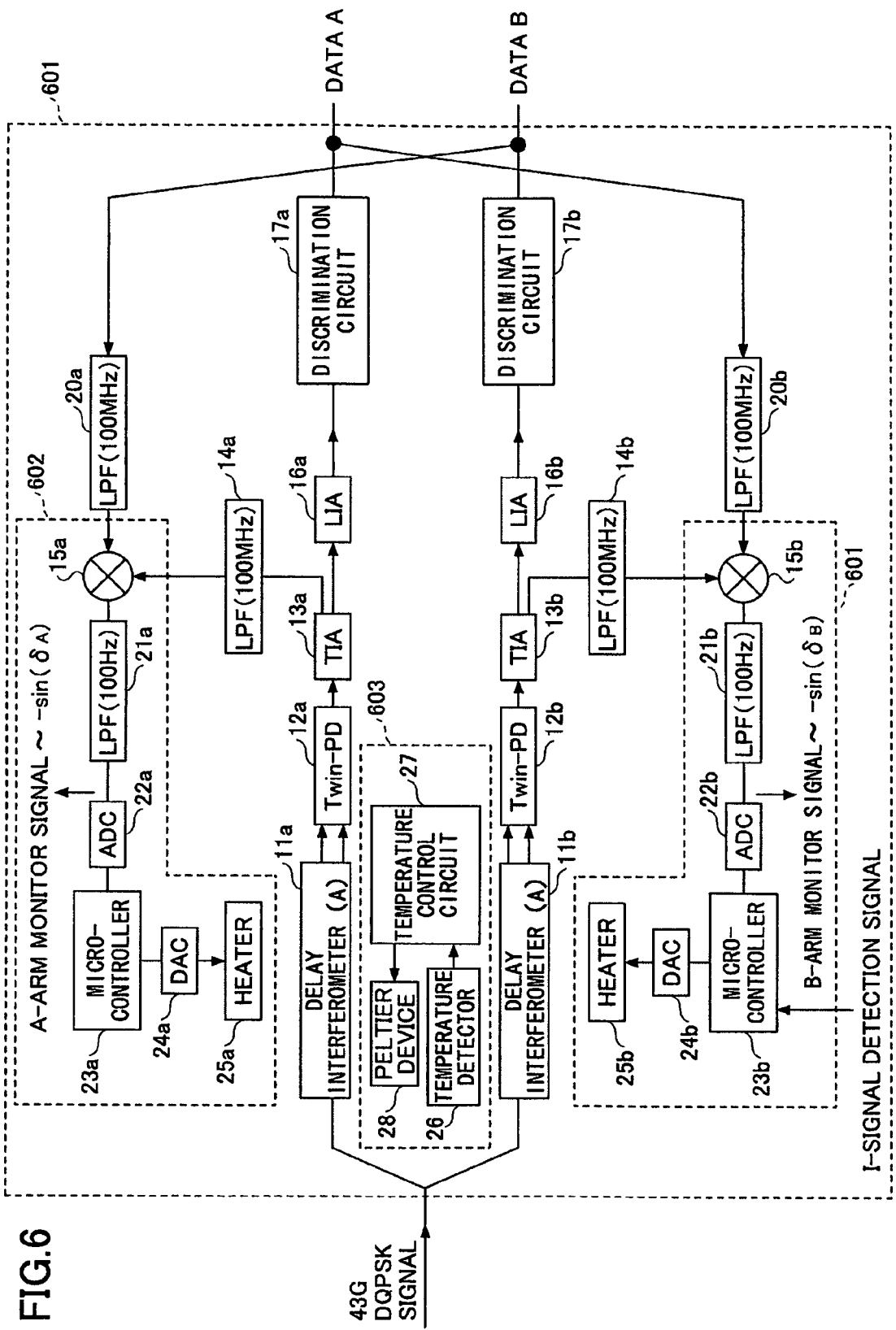
FIG. 6 depicts an exemplary DQPSK reception unit according to an embodiment.

FIG. 6 illustrates an exemplary structure of the DQPSK reception unit 301 depicted in FIG. 3 or the DQPSK reception unit 501 depicted in FIG. 5. In the DQPSK reception unit 601 depicted in FIG. 6, an inputted DQPSK signal is split and guided to an interferometer 11a provided in A branch and an interferometer 11b provided in B branch. The interferometers 11a and 11b correspond to the interferometers 104 and 107, respectively. The delay interferometer 11a includes an optical delay element 105 and phase shift element 106, and the delay interferometer 11b includes an optical delay element 108 and a phase shift element 109. In the present example, the phase shift of the phase shift elements 106 and 109 are adjusted by temperature change. In this case, the increase in temperature of the phase shift elements 106 and 109 results in the increase in phase shift of the phase shift elements 106 and 109, for example. In another embodiment, the phase shift of the phase shift elements 106 and 109 may be adjusted by means of voltage change, for example. The optical reception circuit (Twin-PD) 12a and 12b correspond to the balanced optical detectors 110 and 113, and output current signals corresponding to the output of the delay interferometers 11a and 11b, respectively. Trans-Impedance Amplifiers (TIA) 13a and 13b convert the current signals generated by the optical reception circuit 12a and 12b, respectively, into voltage signals. The output signals from the TIA 13a and 13b correspond to the signals 124 and 128 depicted in FIGS. 3 and 5.

The output signal from the TIA 13a is fed to the input of the mixer 15a via the low-pass filter 14a and to a discrimination circuit 17a via a limiter amplifier (LIA) 16a. The output signal from the TIA 13b is fed to the input of the mixer 15b via the low-pass filter 14b and to a discrimination circuit 17b via a limiter amplifier (LIA) 16b. The mixers 15a and 15b correspond to the mixers 116 and 120, respectively. The cut-off frequency of the low-pass filter 14a and 14b may be about 100 MHz, for example.

The discrimination circuit 17a and 17b correspond to the data recovery circuit 111 and 114, respectively, and includes one or more D flip-flop circuits. The discrimination circuits 17a and 17b determine the logic of output signals from the LIAs 16a and 16b, respectively, using clock recovered based on the received signal. Then, transmitted data is reproduced based on the data signal A from the discrimination circuit 17a and the data signal B from the discrimination circuit 17b.

The output signal (data signal A) from the discrimination circuit 17a is fed to the mixer 15b via the low-pass filter 20b. Similarly, the output signal (data signal B) from the discrimination circuit 17b is fed to the mixer 15a via the low-pass filter 20a. The output signal from the discrimination circuits 17a and 17b correspond to the signals 125 and 129, respectively. The cut-off frequency of the low-pass filter 20a and 20b are about 100 MHz, for example.

The mixer 15a multiplies the output signal from the low-pass filter 14a and the output signal from the low-pass filter 20a. Similarly, the mixer 15b multiplies the output signal from the low-pass filter 14b and the output signal from the low-pass filter 20b. The respective output signals from the mixers 15a and 15b are filtered by the low-pass filters 21a and 21b to filter out their high frequency component, and converted into digital data by the Analog-to-Digital converters (ADC) 22a and 22b. The low-pass filters 221a and 21b correspond to the average circuits 117 and 121, respectively, and their cut-off frequency is about 100 Hz, for example.

The mixer 15a multiplies a signal from the front stage of the discrimination circuit 17a and a signal from the subsequent stage of the discrimination circuit 17b. Similarly, the mixer 15b multiplies a signal from the front stage of the discrimination circuit 17b and a signal from the subsequent stage of the discrimination circuit 17a.

A microcontroller 23a performs predetermined operation to a digital signal outputted from the ADC 22a to generate a phase adjustment signal for the A branch. Similarly, a microcontroller 23b performs predetermined operation to a digital signal outputted from the ADC 22b to generate a phase adjustment signal for the B branch. Those microcontrollers 23a and 23b may be realized by a single processor. The function of the inversion circuit 122 may be provided by the microcontroller 23b.

The phase adjustment signal generated by the microcontrollers 23a and 23b are converted into analog signals by Digital-to-Analog converters (DACs) 24a and 24b, which are fed to heaters 25a and 25b. The heaters 25a and 25b are controlled by the microcontrollers 23a and 23b, respectively. As a result, the temperature of the phase shift element in the delay interferometer 11a and the temperature of the phase shift element in the delay interferometer 11b can be adjusted independently. The phase shift of the phase shift elements of the delay interferometers 11a and 11b depends on their temperature. Thus, the phase shift generated by the phase shift elements in the delay interferometer 11a and 11b is adjusted by the phase adjustment signals generated by the microcontrollers 23a and 23b.

A temperature detector 26 may detect the temperature of or around the delay interferometer 11a and 11b. A temperature control circuit 27 receives the detected temperature information from the temperature detector 26 to generate a temperature control signal for maintaining the temperature of or around the delay interferometers 11a and 11b at a predetermined temperature. A Peltier device 28 maintains the temperature of or around the delay interferometer 11a and 11b in accordance with the temperature control signal. It would be appreciated that, if the phase shift of the phase shift elements of the delay interferometers 11a and 11b can be maintained at a target temperature by means of the heaters 25a and 25b only, the temperature detector 26, the temperature control circuit 27, and the Peltier device 28 may not be provided.

In the DQPSK reception unit 600, the microcontroller 23a controls the heater 25a such that an A-arm monitor signal outputted from the low-pass filter 21a becomes zero. Similarly, the microcontroller 23b controls the heater 25b such that a B-arm monitor signal outputted from the low-pass filter 21b becomes zero. Assuming the phase error of the phase shift element of the delay interferometer 11a is "$\delta_A$," the A-arm monitor signal is proportional to "$-\sin(\delta_A)$," as described with reference to FIG. 3. In addition, assuming the phase error of the phase shift element of the delay interferometer 11b is "$\delta_B$," the B-arm monitor signal is proportional to "$\sin(\delta_B)$." It is noted that the A-arm monitor signal outputted from the low-pass filter 21a becomes zero when the phase shift of the phase shift element of the delay interferometer 11a is maintained at a target value ($\pi/4$, for example), as described with reference to FIG. 3. It is also noted that the B-arm monitor signal outputted from the low-pass filter 21b becomes zero when the phase shift of the phase shift element of the delay interferometer 11b is maintained at a target value ($-\pi/4$, for example), as described with reference to FIG. 3.

Figure 7:
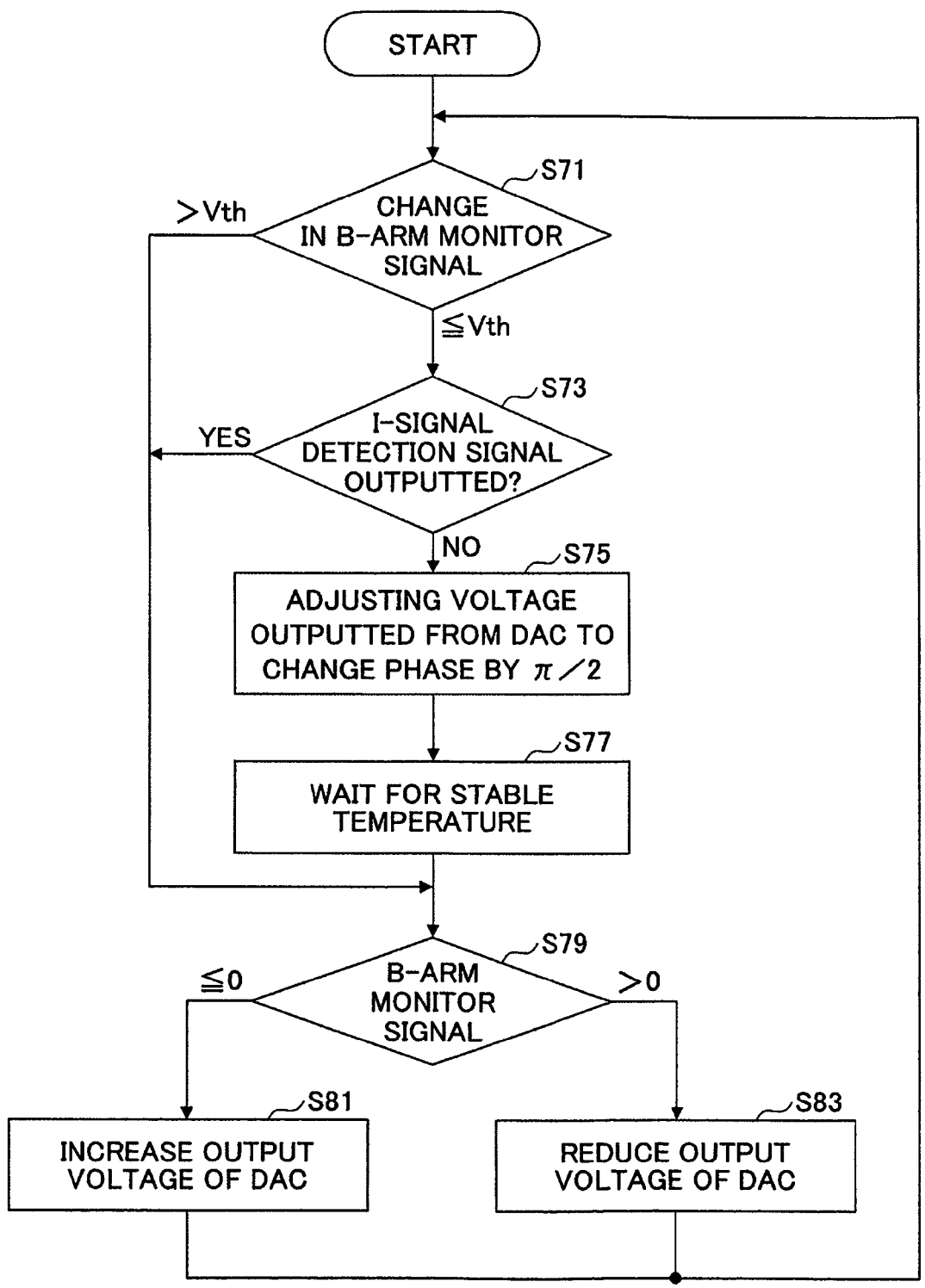
FIG. 7 depicts an exemplary flowchart of a method of controlling a delay interferometer according to an embodiment.

An exemplary method of controlling a delay interferometer according to an embodiment will be described in detail further with reference to a flowchart depicted in FIG. 7. The method controls phase shift as described with reference to FIG. 6. The method additionally try to find the phase of the delay interferometer (B) 11b at which the in-phase signal I is outputted as the data signal B by shifting the phase shift of the delay interferometer (B) 11b by $\pi/2$ if the in-phase signal I is not obtained. It is noted that the DQPSK reception unit 600 is arranged such that the phase shift of the delay interferometer (A) shifts by $\pi/2$ as the phase shift of the delay interferometer (B) being shifted by $\pi/2$.

The method starts at step S71, in which the microcontroller 23b detects the change in the B-arm monitor signal to compare it with a predetermined threshold value Vth. The microcontroller 23b determines whether the control loop of the interferometer becomes stable. The method moves to step S79 if the change in the B-arm monitor signal is greater than the predetermined threshold value Vth. However, the method moves to step S73 if the change in the B-arm monitor signal is equal to or less than the predetermined threshold value Vth.

The microcontroller 23b determines whether the DSMCC 302 (see FIGS. 3 and 5) outputs the I-signal detection signal 303 (FIGS. 3 and 5) at step S73. Outputting the I-signal detection signal indicates that the DQPSK reception unit 301 and 501 (FIGS. 3 and 5) outputs the in-phase signal I as the data signal B, in which case the method moves to step S79. The absence of the I-signal detection signal indicates that a signal other than the in-phase signal I (such as the quadrature signal Q) is being outputted as the data signal B, in which case the method moves to step S75.

The microcontroller 23b controls the temperature of the heater 25b via the DAC 24b such that the phase of the delay interferometer (B) 11b is shifted by $\pi/2$ in step S75. The data signal outputted from the DQPSK reception unit 600 may change, for example, from the quadrature signal Q to the in-phase signal I as the phase of the delay interferometer (B) 11b being changed.

The microcontroller 23b waits until the temperature of the delay interferometer (B) 11b becomes stable in step S77.

Then, in step S79, the microcontroller 23b determines whether the B-arm monitor signal being positive, zero or negative. If the B-arm monitor signal is zero or negative, the method moves to step S81, in which the output voltage of DAC 24b is increased, and then returns to step S71. If the B-arm monitor signal is positive, the method moves to step S83, in which the output voltage of DAC 24b is reduced, and then returns to step S71. According to the arrangement, the B-arm monitor signal becomes stable in the neighborhood of zero.

If the data signal B changes to a signal other than the in-phase signal I by shifting the phase of the delay interferometer (B) 11b by $\pi/2$ in step S75, the steps S71 through S83 are repeated until the in-phase signal I is output as the data signal B.

An example of characteristic pattern of OTU 3 signal is described with reference to FIG. 2. FIG. 8 depicts various signal pattern of the OTU 3 signal which may be used in other embodiments.

Referring to FIG. 8 (1), signal pattern (a) is the signal pattern Q depicted in FIG. 2. Signal pattern (b) is the signal pattern in which the signal pattern (a) has been delayed by 4 bits. Signal pattern (c) is the result of external OR (EXOR) operation between the signal patterns (a) and (b). In this case, the signal pattern (c) includes two 8-bit consecutive 0's (designated as 810 and 811) and the signal pattern (a) includes a "0110" pattern at a corresponding position to the position in (c) between the two 8-bit consecutive 0's (810 and 811). The DSMCC can detect the two 8-bit consecutive 0's (810 and 811) and "0110" (812) therebetween to determine that the data signal B is the quadrature signal Q. It would be appreciated by one with ordinary skill in the art that such a determination may result in the correct demodulation of DQPSK signals in view of this disclosure.

Referring to FIG. 8 (2), the signal pattern (a) is the inverted version of the signal pattern Q depicted in FIG. 2. Signal pattern (b) is the signal pattern in which the signal pattern (a) has been delayed by 4 bits. Signal pattern (c) is the result of external OR (EXOR) operation between the signal patterns (a) and (b). In this case, the signal pattern (c) includes two 8-bit consecutive 0's (designated as 820 and 821) and the signal pattern (a) includes a "1001" pattern at a corresponding position to the position in (c) between the two 8-bit consecutive 0's (820 and 821). The DSMCC can detect the two 8-bit consecutive 0's (820 and 821) and "1001" (822) therebetween as a characteristic pattern to determine that the data signal B is the inverted version of the quadrature signal Q. It would be appreciated by one with ordinary skill in the art that such a determination may result in the correct demodulation of DQPSK signals in view of this disclosure.

Referring to FIG. 8 (3), the signal pattern (a) is the signal pattern I depicted in FIG. 2. Signal pattern (b) is the signal pattern in which the signal pattern (a) has been delayed by 4 bits. Signal pattern (c) is the result of external OR (EXOR) operation between the signal patterns (a) and (b). In this case, the signal pattern (c) includes two 8-bit consecutive 0's (designated as 830 and 831) and the signal pattern (a) includes a "0000" pattern at a corresponding position to the position in (c) between the two 8-bit consecutive 0's (830 and 831). The DSMCC can detect the two 8-bit consecutive 0's (830 and 831) and "0000" (832) therebetween as a characteristic pattern to determine that the data signal B is the in-phase signal I. An exemplary operation of DSMCC in this case will be described in detail with reference to FIG. 9.

Referring to FIG. 8 (4), the signal pattern (a) is the inverted version of the signal pattern I depicted in FIG. 2. Signal pattern (b) is the signal pattern in which the signal pattern (a) has been delayed by 4 bits. Signal pattern (c) is the result of external OR (EXOR) operation between the signal patterns (a) and (b). In this case, the signal pattern (c) includes two 8-bit consecutive 0's (designated as 840 and 841) and the signal pattern (a) includes a "1111" pattern (designated as 842) at a corresponding position to the position in (c) between the two 8-bit consecutive 0's (840 and 841). The DSMCC can detect the two 8-bit consecutive 0's (840 and 841) and "1111" (842) therebetween as a characteristic pattern to determine that the data signal B is the inverted version of the in-phase signal I. It would be appreciated by one with ordinary skill in the art that such a determination may result in the correct demodulation of DQPSK signals in view of this disclosure.

Figure 9:
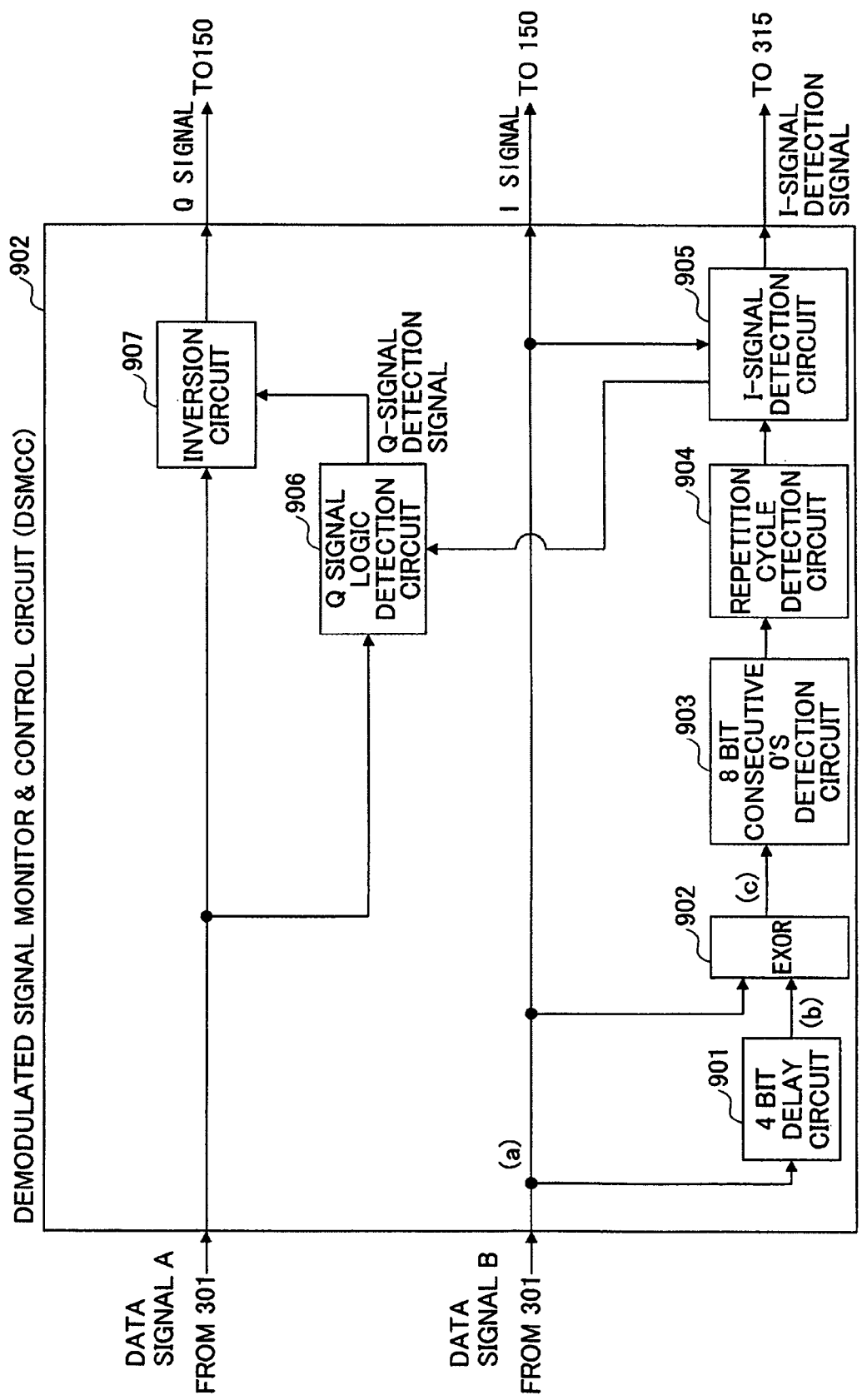
FIG. 9 depicts an exemplary demodulated signal monitor & control circuit according to another embodiment.

FIG. 9 depicts an exemplary DSMCC 902 according to another embodiment. The DSMCC 902 corresponds to the DSMCC 302 depicted in FIG. 5, and may detect the in-phase signal I based on the characteristic pattern described with reference to FIG. 8(3).

The DSMCC 902 depicted in FIG. 9 includes a 4-bit delay circuit 901, an external OR (EXOR) circuit 902, an 8-bit consecutive 0's detection circuit 903, a repetition cycle detection circuit 904, an I-signal detection circuit 905, a Q-signal logic detection circuit 906, and an inversion circuit 907. FIG. 9 further indicates measuring points at which the signal patterns (a), (b) and (c) of FIG. 8(3) can be measured in the DSMCC 902 for better understanding of the correspondence between FIG. 8 (3) and FIG. 9. When the data signal B is the in-phase signal I (see FIG. 8 (3) (a)), the 4-bit delay circuit 901 receives the in-phase signal I as the data signal B and outputs a 4-bit delayed signal (see FIG. 8 (3) (b)). The EXOR circuit 902 receives the data signal B being the in-phase signal I to one of its inputs and the 4-bit delayed signal outputted from the 4-bit delay circuit 901 to the other of its inputs, and performs an external OR (EXOR) operation thereon, and outputs the result of the EXOR operation as an EXOR signal thereof (see FIG. 8 (3) (c)). The 8-bit consecutive 0's circuit 903 receives the EXOR signal and detects the 8-bit consecutive 0's pattern (see FIG. 8 (3) 830 and 831) in the EXOR signal. The 8-bit consecutive 0's circuit 903 outputs a pattern detection signal indicating that the 8-bit consecutive 0's pattern has been detected. The pattern detection signal is fed to the repetition cycle detection circuit 904. The repetition cycle detection circuit 904 detects the repetition cycle of the pattern detection signal and outputs a repetition signal indicating the repetition cycle. The I-signal detection circuit 905 receives the repetition signal at one of its inputs and the data signal B at the other input. The I-signal detection circuit 905 determines whether the data signal B includes the signal pattern "0000" (see FIG. 8 (3), 832) between the two 8-bit consecutive 0's (see FIG. 8 (3), 830 and 831) based on the repetition signal. If the data signal B includes the signal pattern "0000," the I-signal detection circuit 905 determines that the data signal B is the in-phase signal I, and outputs an I-signal detection signal indicating the detection of the in-phase signal I as the data signal B. The outputted I-signal detection signal is fed to the phase control unit 315 of the DQPSK reception unit 301.

In addition, if the I-signal detection circuit 905 detects the signal pattern "0000," the I-signal detection circuit 905 further outputs a signal indicating the detection of the in-phase signal I (the I-signal detection signal, for example) to the Q-signal logic detection circuit 906.

The detection of the in-phase signal I as the data signal B means that the DQPSK reception unit 301 outputs the quadrature signal Q or its inverted version as the data signal A. When the Q-signal logic detection circuit 906 receives the signal indicating the detection of the in-phase signal I, the Q-signal logic detection circuit 906 examines the data signal A and determines whether the data signal A is the quadrature signal Q. The determination can be made by detecting the signal pattern 211 of the quadrature signal Q in the data signal A as described with reference to FIG. 2. The occurrence of the signal pattern 211 (FIG. 2) of the quadrature signal Q in the data signal A means that the data signal A is the quadrature signal Q. If the data signal A is the quadrature signal Q, the Q-signal logic detection circuit 906 sends a Q-signal detection signal indicating that the Q signal is obtained to the inversion circuit 907. The Q-signal detection signal causes the reversion circuit 907 to path the data signal A without inverting it.

The absence of the signal pattern 211 (FIG. 2) of the quadrature signal Q in the data signal A means that the data signal A is the inverted version of the quadrature signal Q. The Q signal logic detection circuit 906 does not output the Q-signal detection signal to the reversion circuit 907. In the absence of the Q-signal detection signal from the Q signal logic detection circuit 907, the inversion circuit 906 outputs the inverted version of the data signal A, or the quadrature signal Q.

Figure 10:
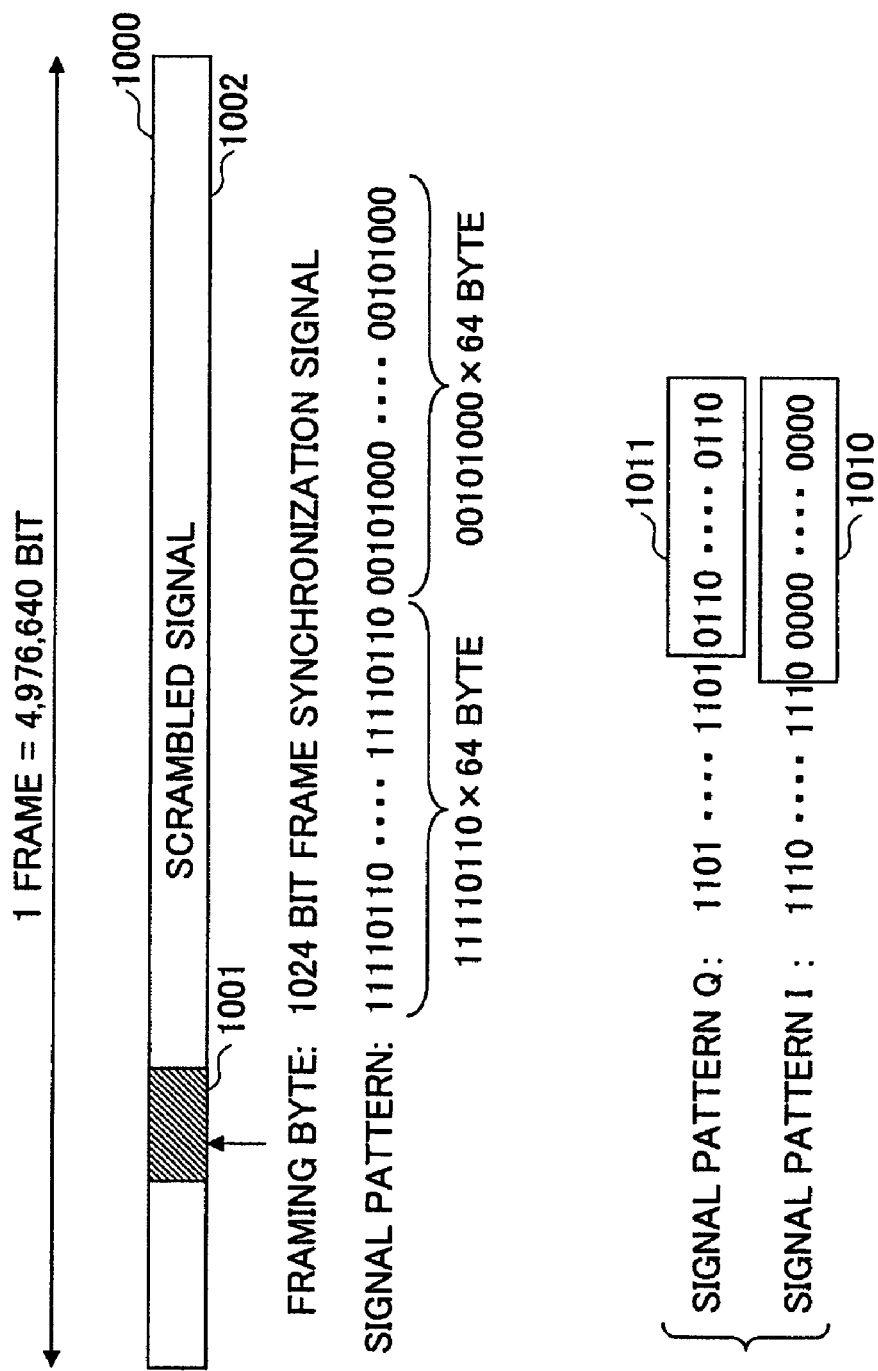
FIG. 10 depicts an exemplary signal pattern of a signal other than the OTU 3 signal which may be used in another embodiment.

The embodiments described above use the characteristic patterns occurring in the OTU 3 signal. Some embodiments may use the characteristic patterns occurring in a signal other than the OTU 3 signal. FIG. 10 depicts an exemplary signal pattern of a signal other than the OTU 3 signal which may be used in another embodiment. FIG. 10 depicts a frame format of STM-256/OC-768 (39.8 Gb/s) signal, which is 4,976,640 bits long including a frame region 1001 which includes framing byte and a frame region 1002 which includes payload and other scrambled data. The framing byte is a 1024-bit long frame synchronization signal having a signal pattern illustrated in FIG. 10.

The DQPSK modulation scheme combines two bits into one symbol and transmits the symbol as the quadrature signal Q or in-phase signal I. FIG. 10 depicts the signal patterns of the quadrature signal Q and the in-phase signal I. It is noted that the signal pattern of I signal includes a characteristic pattern, the occurrence of 257 consecutive 0's as designated by reference numeral 1010. It is also noted that the signal pattern of Q signal includes a characteristic pattern which is the occurrence of "0110 . . . 0110" as designated by reference numeral 1011. A portion of the 257-bit consecutive 0's may be used as a characteristic pattern for the detection of I signal. In this case, the length of the characteristic pattern is preferably 10 bits or more for more accuracy in detection. A portion of the "0110 . . . 0110" pattern 1011 may be used as a characteristic pattern for determining whether the signal Q is inverted.

Figure 11:
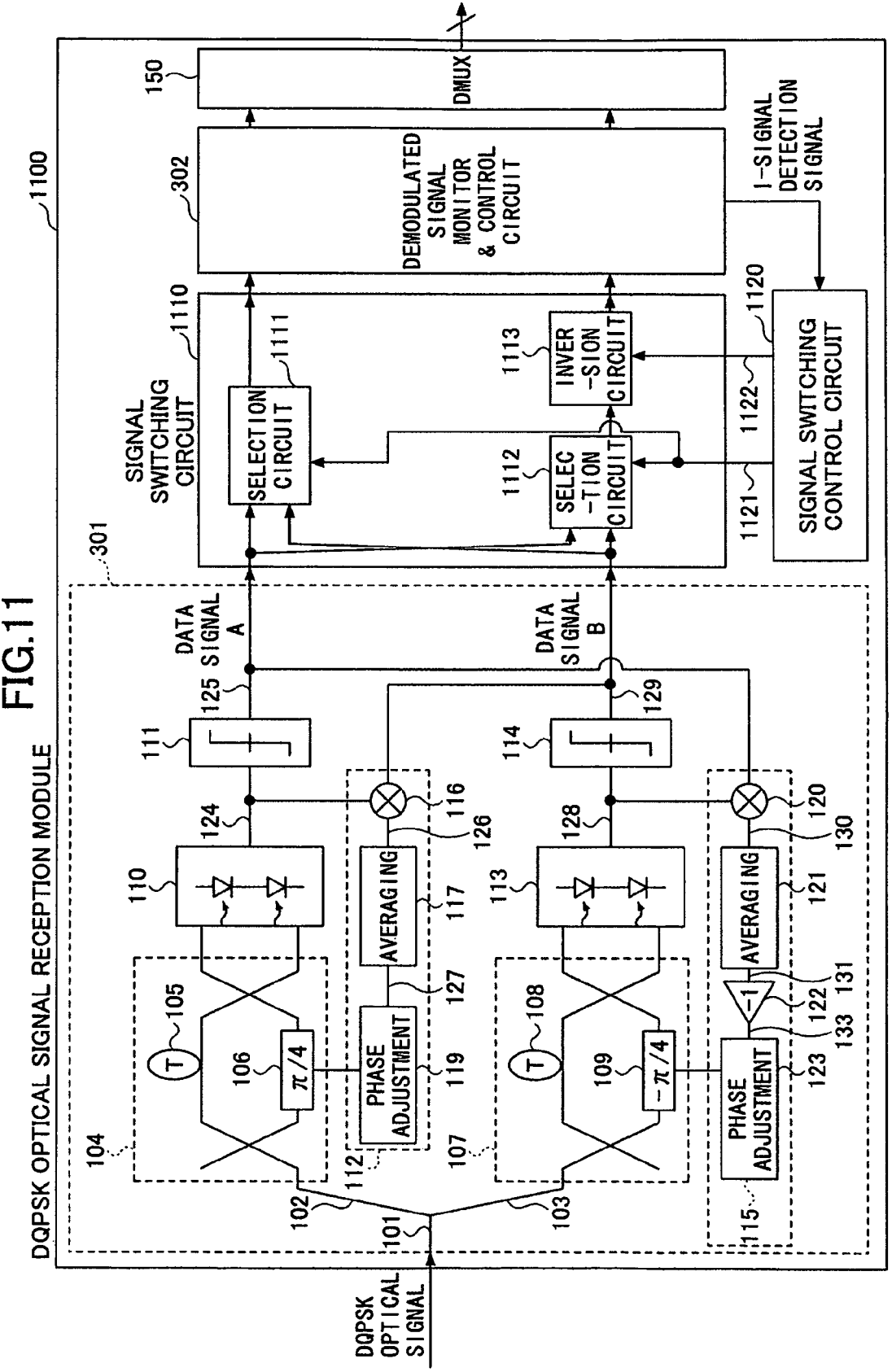
FIG. 11 depicts another variation of DQPSK optical signal reception module of FIG. 3.

FIG. 11 depicts another variation of DQPSK optical signal reception module of FIG. 3. The DQPSK optical reception module 1100 depicted in FIG. 11 is different from the DQPSK optical reception module 300 in that a signal switching circuit 1110 is provided between the DQPSK reception unit 301 and the DSMCC 302, the signal switching circuit 1110 being controlled by a signal switching control circuit 1120. In addition, the I-signal detection signal outputted from the DSMCC 302 is fed to the signal switching control circuit 1120, instead of the phase control unit 115 of the DQPSK reception unit 301.

The signal switching circuit 1110 includes selection circuits 1111 and 1112 and an inversion circuit 1113. The selection circuit 1111 receives at its first and second inputs the data signal A and B, respectively, from the DQPSK reception unit 301. The selection circuit 1111 receives at its third input a selection circuit control signal 1121 from the signal switching control circuit 1120. The output of the selection circuit 1111 is directly connected to the first input of the DSMCC 302.

The selection circuit 1112 receives at its first and second inputs the data signals A and B, respectively, from the DQPSK reception unit 301. The selection circuit 1112 receives at its third input a selection circuit control signal 1121 from the signal switching control circuit 1120. The output of the selection circuit 1112 is directly connected to the first input of the inversion circuit 1113. The inversion circuit 1113 receives at its second input an inversion circuit control signal 1122 from the signal switching control circuit 1120. The output of the selection circuit 1113 is connected to the second input of the DSMCC 302.

Thus, one of the data signals (the data signal B, for example) outputted from the DQPSK reception unit 301 is fed to the first input of the DSMCC 302 via one of the selection circuits 1111 and 1112. Similarly, the other data signal (the data signal A, for example) outputted from the DQPSK reception unit 301 is fed to the second input of the DSMCC 302 via the other selection circuit and the inversion circuit 1113. That is to say, the selection circuits 1111 and 1112 act as a switching circuit for routing the data signals A and B.

The DSMCC 302 has been described with reference to FIG. 4. As described with reference to FIG. 4, the DSMCC 302 detects a characteristic pattern of the signal (the data signal A, in this case) fed to its second input and determines the repetition cycle of the signal. If the DSMCC 302 determines that the signal is the in-phase signal I, the DSMCC 302 outputs the I-signal detection signal. The I-signal detection signal is fed to the signal switching control circuit 1120. The signal switching control circuit 1120 does not change the setting of the signal switching circuit 1110 while the I-signal detection signal is outputted from the DSMCC 302.

If the DSMCC 302 fails to send the I-signal detection signal, the signal switching control circuit 1120 waits for a predetermined time period, for example, and then outputs the selection circuit control signal 1121 and/or the inversion circuit control signal 1122 to the signal switching circuit 1110 to sequentially change the setting of the signal switching circuit 1110.

An assumption is made that, for example, the data signal A is the quadrature signal Q and the data signal B is the inverted version of the in-phase signal I under a certain reception condition (demodulation condition) of the DQPSK reception unit 301 at time t1. In addition, an assumption is made that the selection circuit 111 outputs the data signal B being the inverted version of the in-phase signal I to the first input of the DSMCC 302. Further, an assumption is made that the selection circuit 1112 outputs the data signal A being the quadrature signal Q, and the inversion circuit inverts the quadrature signal Q to send the inverted version of the quadrature signal Q to the second input of the DSMCC 302. The first raw of Table 1 indicates the output of the selection circuit 1111, the output of the selection circuit 1112, the first input of the DSMCC 302 and the second input of the DSMCC 302.

At time t2, since the DSMCC 302 does not output the I-signal detection signal, the signal switching control circuit 1120 sends an inversion circuit control signal to the inversion circuit 1113 to set the inversion circuit 1113 to non-inverting state. At time t3, since the DSMCC 302 does not output the I-signal detection circuit, the signal switching control circuit 1120 maintains the inversion circuit 1113 to be non-inverting state and sends a selection circuit control signal to the selection circuits 1111 and 1112 such that the selection circuit 1111 outputs the data signal A, which is the quadrature signal Q and the selection circuit 1112 outputs the data signal B, which is the inverted version of the in-phase signal I. At time t4, since the DSMCC 302 does not output the I-signal detection signal, the signal switching control circuit 1120 sends an inversion circuit control signal to the inversion circuit 1113 to set the inversion circuit 1113 to inverting state again. Then, the DSMCC 302 starts receiving the in-phase signal I at its second input and detects the in-phase signal I to output the I-signal detection signal. In this case, the DSMCC 302 receives the quadrature signal Q at its first input. As described with reference to FIG. 4, the inversion circuit 404 of the DSMCC 302 outputs the quadrature signal Q without inverting it. As a result, the DSMCC 302 outputs the quadrature signal Q and the in-phase signal I from the first and second outputs, respectively.

TABLE 1

| Time | Selection circuit 1111 Output | Selection circuit 1112 Output | DSMCC 302 First input | DSMCC 302 Second input |
|---|---|---|---|---|
| t1 | I (inverted) | Q | I (inverted) | Q (inverted) |
| t2 | I (inverted) | Q | I (inverted) | Q |
| t3 | Q | I (inverted) | Q | I (inverted) |
| t4 | Q | I (inverted) | Q | I |

The provision of the signal switching circuit 1110 and the signal switching control circuit 1120 between the DQPSK reception unit 301 and the DSMCC 302 allows the quadrature signal Q and the in-phase signal I to be output within a shorter time period than the time period required for the phase change by means of temperature change.

Figure 12:
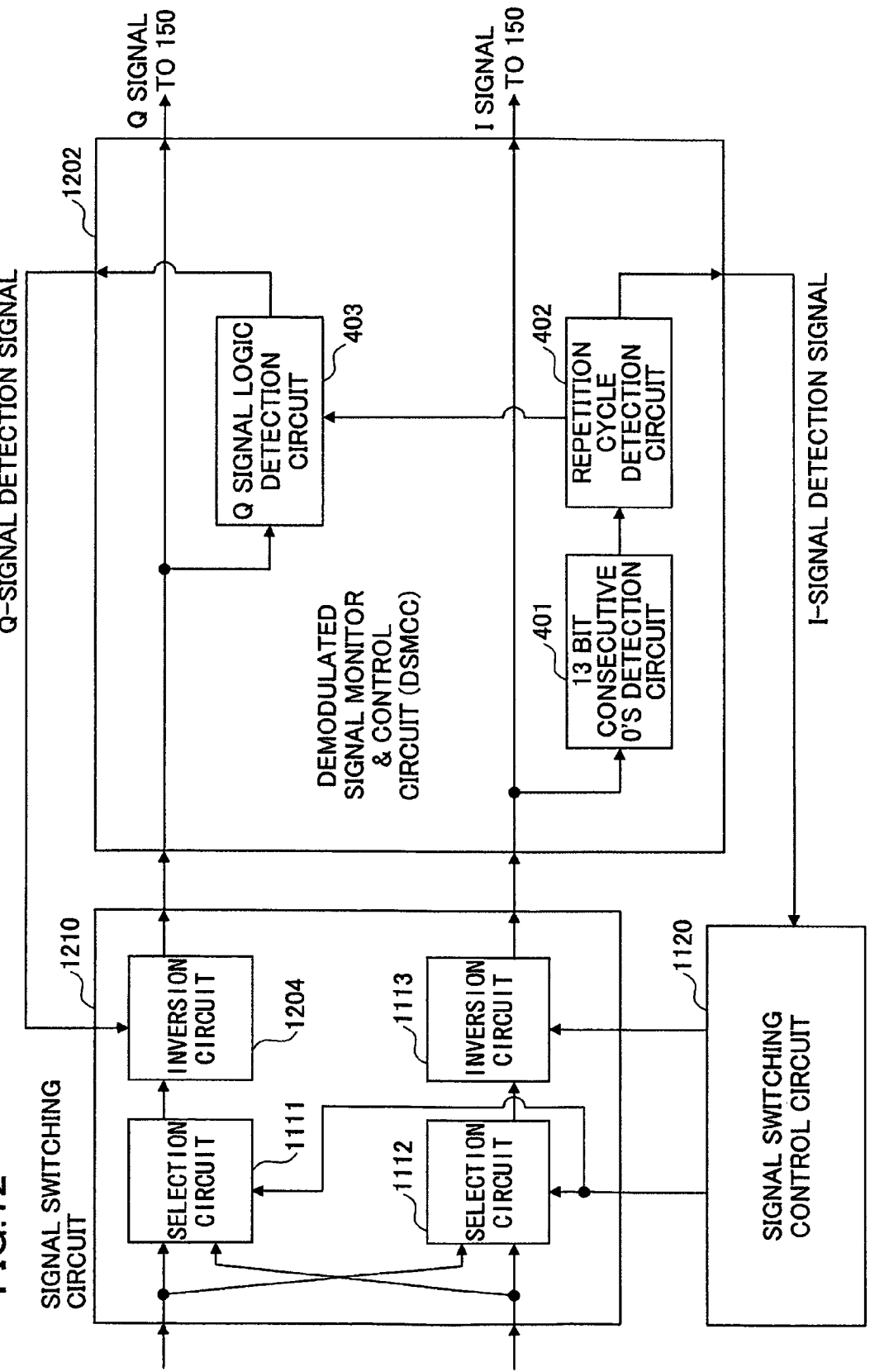
FIG. 12 depicts a variation of DQPSK optical signal reception module of FIG. 11.

FIG. 12 depicts a variation of DQPSK optical signal reception module of FIG. 11. FIG. 12 depicts a signal switching control circuit 1210 and a demodulated signal monitor & control circuit (DSMCC) 1202, which correspond to the signal switching control circuit 1110 and the DSMCC 302, respectively, illustrated in FIG. 11. FIG. 12 further depicts a signal switching control circuit 1220, which is basically the same as the signal switching control circuit 1120 illustrated in FIG. 11. In FIG. 11, the inversion circuit provided in the DSMCC 302 (the inversion circuit 404 in FIG. 4, but not shown in FIG. 11) is now provided in the signal switching circuit 1210 (the inversion circuit is designated as 1204) and the Q-signal detection signal from the Q signal logic detection circuit 403 is fed to the inversion circuit 1204. The provision of the signal switching circuit 1210 and the signal switching control circuit 1120 between the DQPSK reception unit 301 and the DSMCC 302 for electrically routing the data signals from the DQPSK reception unit 301 allows the quadrature signal Q and the in-phase signal I to be output within a shorter time period than the time period required for the phase change using temperature change.

Figure 13:
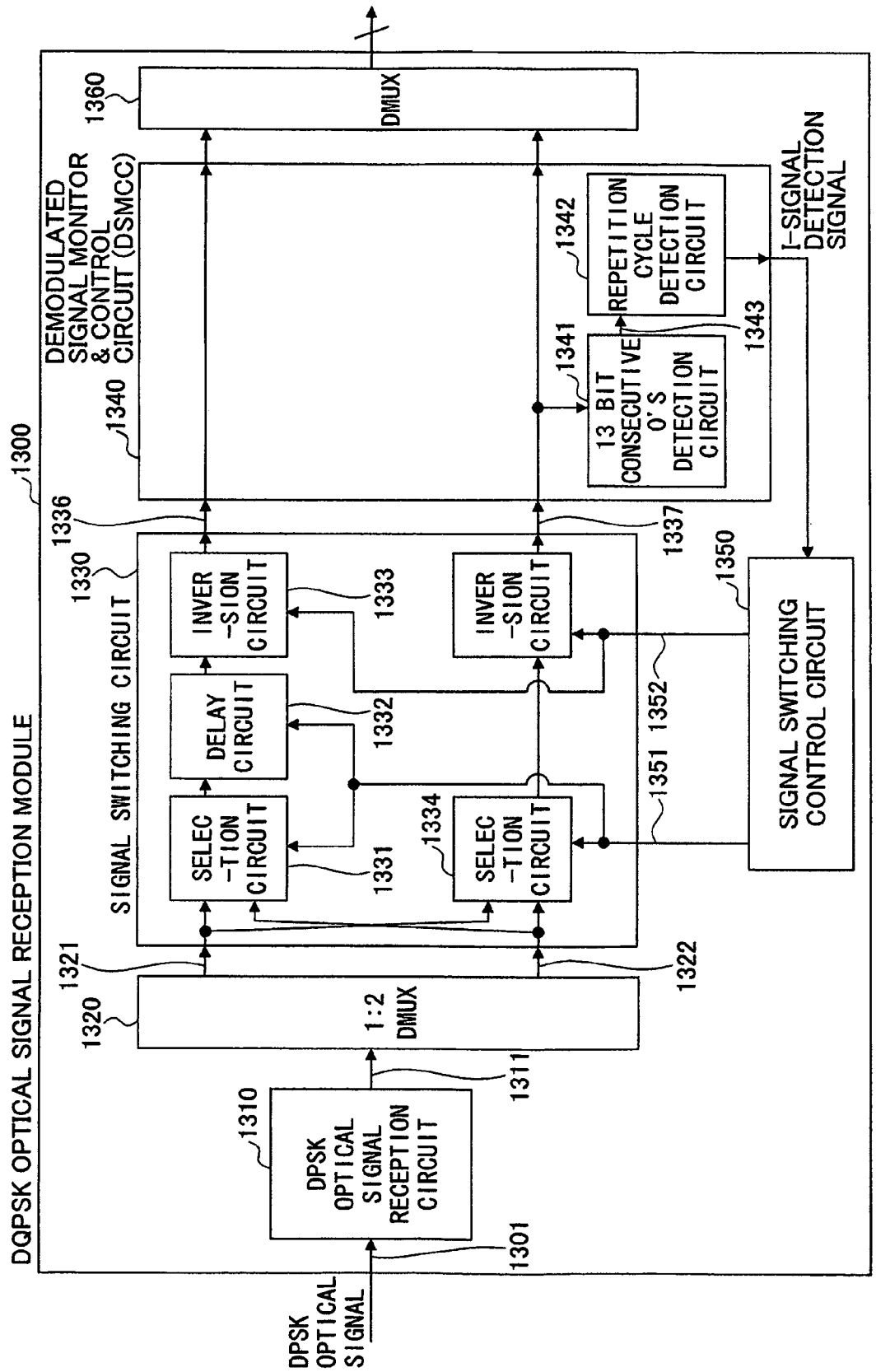
FIG. 13 depicts an exemplary DPSK optical signal reception module according to an embodiment.

Embodiments utilizing DQPSK modulation scheme have been describe. According to some embodiments, the characteristic patterns may be used for eliminating the uncertainty in output signals of Differential Phase Shift Keying (DPSK) modulation scheme. FIG. 13 depicts an exemplary DQPSK optical signal reception module according to an embodiment. In the DPSK optical signal reception module 1300 depicted in FIG. 13, a DPSK optical signal 1301 is fed to a DPSK optical reception circuit 1310 and demodulated into a serial data signal 1311. The modulated signal 1311 outputted from the DPSK optical reception circuit 1310 is fed to a 1:2 demultiplexer 1320 for de-multiplexing. The 1:2 demultiplexer 1320 outputs the de-multiplexed data signals 1321 and 1322.

It is assumed that the DQPSK optical signal 1301 is formatted into OTU3 signal frame format. Because the demodulated signal 1311 based on the DPSK optical signal 1301 is de-multiplexed using the 1:2 demultiplexer 1320, one of the data signals 1321 and 1322 outputted from the 1:2 demultiplexer 1320 includes the characteristic pattern 210 in a similar manner to the signal patter I described with reference to FIG. 2. It should be noted that the demodulated signal 1311 from the DPSK optical reception circuit 1310 may include uncertainty of phase π, and the data signals 1321 and 1322 may be logically inverted.

The DPSK optical reception module 1300 further includes a signal switching circuit 1330, a demodulation signal monitor & control circuit (DSMCC) 1340, and a signal switching control circuit 1350. The data signals 1321 and 1322 outputted from the 1:2 demultiplexer 1320 are selected (switched), delayed and inverted as appropriate and outputted as data signals 1336 and 1337. The operation of the signal switching circuit 1330 will be described in detail below.

The data signal 1337 outputted from the signal switching circuit 1330 is fed to a 13-bit consecutive 0's detection circuit 1341 in the DSMCC 1340. The 13-bit consecutive 0's detection circuit 1341 corresponds to the 13-bit consecutive 0's detection circuit 401 in FIG. 4, and detects the occurrence of the characteristic pattern, that is, 13-bit consecutive 0's (see FIG. 2, 210) in the data signal 1337, and outputs a pattern detection signal 1343 indicating the detection of the characteristic pattern to a repetition cycle detection circuit 1342. The repetition cycle detection circuit 1342 corresponds to the repetition cycle detection circuit 402 described with reference to FIG. 4, and detects whether the repetition cycle of the signal 1343 corresponds to the frame cycle of the DPSK optical signal 1301. The correspondence of the repetition cycle of the signal 1343 to the frame cycle of the DPSK optical signal 1301 suggests that, regardless of the reception condition of the DPSK optical reception circuit 1310, the signal switching circuit 1330 appropriately selects (switches), delays, and inverts as appropriate the data signals 1321 and 1322 and that the data signal 1337 is the right data signal. The repetition cycle detection circuit 1342 outputs an I-signal detection signal indicating the detection of the characteristic pattern in the data signal 1337 to the signal switching control circuit 1350. When the signal switching control circuit 1350 receives the I-signal detection signal from the repetition cycle detection circuit 1342, the signal switching control circuit 1350 determines that the signal switching circuit 1330 is correctly set, and maintains the setting of the signal switching circuit 1330 as is.

The signal switching circuit 1330 includes selection circuits 1331 and 1334, a delay circuit 1332, and inversion circuits 1333 and 1335. In dependence on the selection circuit control signal 1351, the selection circuit 1331 outputs one of the data signals 1321 and 1322 as output 1336, and the selection circuit 1334 outputs the other of the data signals 1321 and 1322 as output 1337. When the signal 1322 is output from the selection circuit 1331, the delay circuit 1332 delays the signal 1322 in dependence on a selection circuit control signal 1351 to arranged the order of the signals 1321 and 1322. The inversion circuits 1333 and 1335 may invert the output from the delay circuit 1332 and the output of the selection circuit 1334, respectively, as appropriate, to output respective signals 1336 and 1337.

If the repetition cycle detection circuit 1342 of the DSMCC 1340 fails to send the I-signal detection signal, the signal switching control circuit 1350 waits for a predetermined time period, for example, and then outputs the selection circuit control signal 1351 and/or the inversion circuit control signal 1352 to the signal switching circuit 1330 to sequentially change the setting of the signal switching circuit 1330.

It is assumed that, for example, the demodulated signal is inverted in dependence on the reception condition (demodulation condition) of the DPSK reception unit 1310. It is also assumed that the (inverted version of the) signal pattern I described with reference to FIG. 2 is outputted at the output 1321 of the 1:2 demultiplexer 1320 and the (inverted version of the) signal pattern Q described with reference to FIG. 2 is outputted at the output 1322. It is further assumed that, at time t1, the signal switching circuit 1330 outputs the (inverted version of the) signal pattern I and the (inverted version of the) signal pattern Q as signals 1336 and 1337 in dependence on the setting of the signal switching circuit 1330. The signals 1336 and 1337 are as shown in Table 2.

At time t2, since the DSMCC 1340 does not output the I-signal detection signal, the signal switching control circuit 1350 sends an inversion circuit control signal 1352 to the inversion circuits 1333 and 1335 to set the inversion circuits 1333 and 1335 to inverting state. The signals 1336 and 1337 at time t2 are also shown in Table 2. At time t3, since the DSMCC 1340 does not output the I-signal detection signal, the signal switching control circuit 1350 maintains the inversion circuit 1113 in inverting state, and sends a selection circuit control signal 1351 to the selection circuits 1331 and 1332 to change the setting of the selection circuits 1331 and 1334. The signals 1336 and 1337 at time t3 are also shown in Table 2. Then, the signal pattern I is output as the signal 1337, the DSMCC 1340 detects the characteristic pattern (FIG. 2, 210) in the signal pattern I to output the I-signal detection signal. As a result, the DSMCC 1340 can output the right signals. The demodulated signals are further de-multiplexed by a demultiplexer 1360.

TABLE 2

| time | Signal 1336 | Signal 1337 |
| --- | --- | --- |
| t1 | I (inverted) | Q (inverted) |
| t2 | I | Q |
| t3 | Q | I |

As described above, the uncertainty of the DPSK optical reception circuit 1310 can be eliminated with a relatively small sized circuit.

Figure 14:
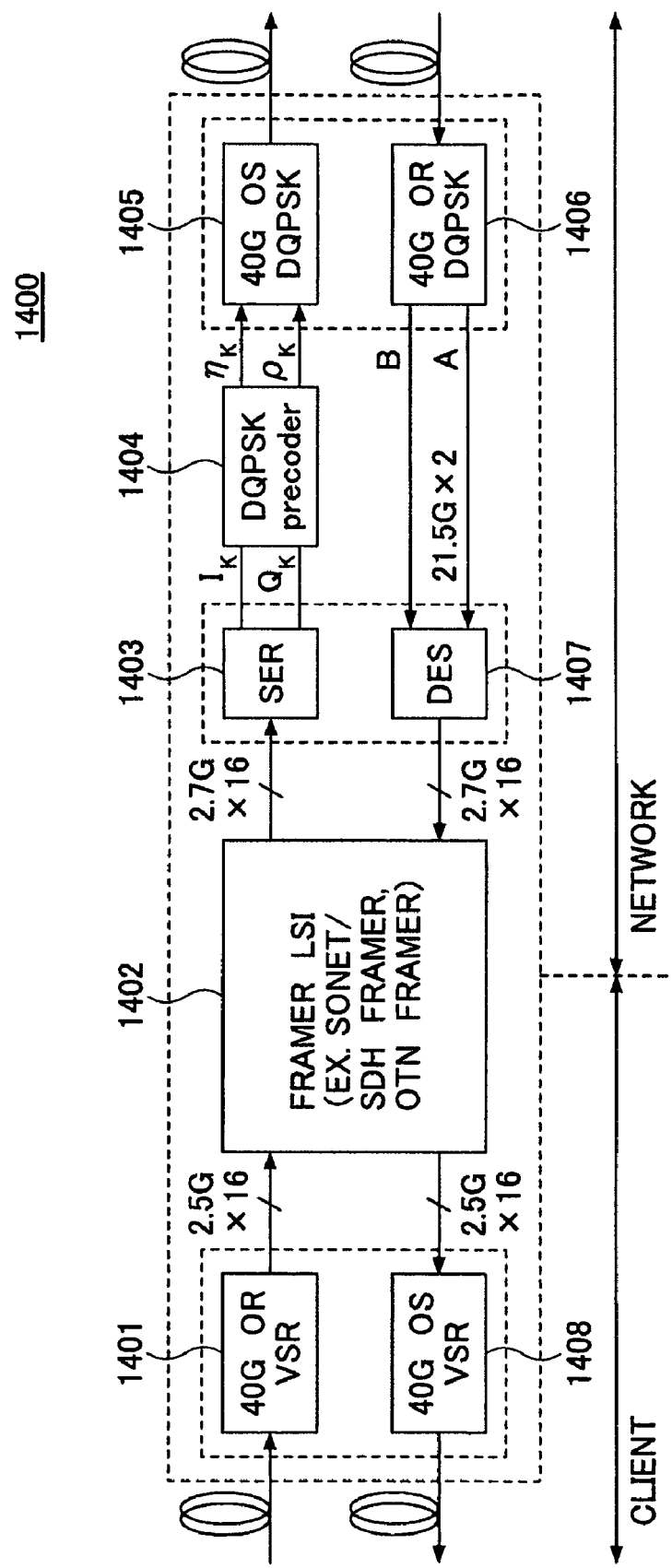
FIG. 14 depicts an exemplary DQPSK transponder according to an embodiment.

FIG. 14 depicts an exemplary DQPSK transponder according to an embodiment. The DQPSK transponder 1400 depicted in FIG. 14 is an example of a 40 G bit rate transponder. In FIG. 14, the left side of the vertical broken line is a client (user) side and the right side the Wavelength Division Multiplexing (WDM) transmission network side.

In the transponder 1400, a data signal from the client (user) side is received by an optical reception unit (40 G OR VSR) 1401 at 40 G bit rate through an optical fiber. The optical reception unit (40 G OR VSR) 1401 outputs electric data signals as 16 parallel data signal at 2.5 Gb rate.

The output signal from the optical reception unit 1401 is framed with overhead into Synchronous Optical NETwork/Synchronous Digital Hierarchy (SONET/SDH) or OTN (an interface of an optical transmission network in accordance with ITU-T G.709), for example by a framer LSI 1402. The framer LSI 1402 outputs 2.7 Gb-rate 16 parallel data signals.

The 2.7 Gb-rate 16 parallel data signals from the framer LSI 1402 are converted into 21.5 Gb-rate two parallel data signals Ik and Qk by a serializer (SER) 1403.

The outputs Ik and Qk of the serializer (SER) 1403 are input to a DQPSK precoder 1404, which outputs data signal $\rho_k$ and $\eta_k$ in accordance with predetermined logical operation. The output signals $\rho_k$ and $\eta_k$ are fed to DQPSK optical transmitter (40 G OS DQPSK) 1405 to output 43 Gb-rate optical signals to the network side.

On the other hand, about 43 Gb-rate optical signal fed from the network side are received a DQPSK optical reception unit (40 G OR DQPSK) 1406. Received data signals B and A of about 21.5 Gb-rate outputted from the DQPSK optical reception unit 1406 are converted into 2.7 Gb/s sixteen parallel data signals by a de-serializer (DES) 1407. The output signal from the de-serializer (DES) 1407 is output by the framer LSI 1402 as data signal of each channel from the multiplexed frame such as SONET/SDH or OTN. The 2.5 Gb/s sixteen parallel data signals are transmitted by an optical transmission unit (40 G SR VSR) 1408 to the client side as a 40 Gb/s serial data optical signal through an optical fiber.

For example, the combination of the DQPSK optical reception unit (40 G OR DQPSK) 1406 and the de-serializer (DES) 1407 corresponds to the DQPSK optical reception module 300 described with reference to FIG. 3.

As described above, an optical reception module according to an embodiment can realize the detection of reception condition with a relatively simple and small circuit without processing the frames of a frame signal. The circuit can be compact and of low power consumption, which can be embedded into an optical reception module. The circuit may realize an optical reception module which does not require an external frame processing circuit.

The disclosed communication apparatus and method can demodulate the data signal with simple arrangement.

Embodiments have been described in detail with reference to the accompanied drawings. The present invention, however, is not limited by those embodiments. It would be appreciated that modifications and alterations can be made to those embodiments within the spirit and scope of claimed inventions.

What is claimed is:

1. A communication apparatus, comprising:
   a reception unit configured to demodulate a received signal to output a first demodulated signal in dependence on a reception condition;
   a pattern detection unit configured to detect a characteristic pattern in the first demodulated signal to output a pattern detection signal; and
   a repetition cycle detection unit configured to detect a repetition cycle of the characteristic pattern based on the pattern detection signal to output a first detection signal indicating that the first demodulated signal is one of an in-phase signal and a quadrature signal, or an inverted version of the one of the in-phase signal and the quadrature signal,
   wherein the reception condition of the reception unit is controlled based on the presence or absence of the first detection signal.

2. The communication apparatus as claimed in claim 1,
   wherein the reception unit further outputs a second demodulated signal in dependence on the reception condition; and
   the communication apparatus further comprises a logic detection unit configured to detect a signal logic of the second demodulated signal to output a second detection signal indicating that the second demodulated signal is the other of the in-phase signal and the quadrature signal or an inverted version of the other of the in-phase signal and the quadrature signal.

3. The communication apparatus as claimed in claim 2, further comprising a second-demodulated-signal inversion unit configured to invert the second demodulated signal in dependence on the second detection signal.

4. The communication apparatus as claimed in claim 2, further comprising a demultiplexer configured to demultiplex the first demodulated signal and the second demodulated signal.

5. The communication apparatus as claimed in claim 1,
   wherein the pattern detection unit further comprises:
   a delay unit configured to delay the first demodulated signal; and
   a logical operation unit configured to perform logical operation between the first demodulated signal and a delayed version of the first demodulated signal by the delay unit to output a logical operation signal,
   wherein the pattern detection unit detects the characteristic pattern of the logical operation signal to output the pattern detection signal.

6. The communication apparatus as claimed in claim 5, wherein the repetition cycle detection unit detects repetition cycle of the characteristic pattern in dependence of the pattern detection signal, and detects a predetermined pattern of the first demodulated signal in dependence on the detection of the repetition cycle to output a first detection signal.

7. The communication apparatus as claimed in claim 1,
   wherein the reception unit further outputs a second detection signal in dependence on the reception condition; and
   the communication apparatus further comprises a switching unit connected between the reception unit and the pattern detection unit and configured to switch the first modulated signal and the second modulated signal in dependence on the presence and absence of the first detection signal.

8. The communication apparatus as claimed in claim 7, further comprising a first-demodulated-signal inversion unit configured to logically invert the first demodulated signal and/or the second demodulated signal.

9. The communication apparatus as claimed in claim 1, further comprising a transmission unit configured to transmit a transmission signal.

10. The communication apparatus as claimed in claim 1, wherein the received signal is a DQPSK signal.

11. The communication apparatus as claimed in claim 1, further comprising a first signal inversion unit configured to invert the first signal.

12. The communication apparatus as claimed in claim 1, wherein the characteristic pattern is a predetermined signal pattern in a control region of the modulated signal.

13. The communication apparatus as claimed in claim 1, wherein the received signal is an OTU3 signal or STM-256/OC-768 signal.

14. A transponder comprising the communication apparatus as claimed in claim 1.

15. The communication apparatus as claimed in claim 7, wherein the received signal is a DPSK signal; and
the reception unit comprises a DPSK reception unit and a 1-to-2 demultiplexer.

16. A method of receiving a signal, the method comprising:
demodulating a received signal to output a first demodulated signal in dependence on a reception condition;
detecting a characteristic pattern in the first demodulated signal to output a pattern detection signal;
detecting a repetition cycle of the characteristic pattern based on the pattern detection signal to output a first detection signal indicating that the first demodulated signal is one of an in-phase signal and a quadrature signal, or an inverted version of the one of the in-phase signal and the quadrature signal; and
controlling the reception condition based on presence or absence of the first detection signal.

17. The method as claimed in claim 16, further comprising demodulating a received signal to output a second demodulated signal in dependence on the reception condition and selecting the first demodulated signal and the second demodulated signal in dependence on the first detection signal.

* * * * *